(12) United States Patent
Wieker et al.

(10) Patent No.: US 12,200,135 B2
(45) Date of Patent: Jan. 14, 2025

(54) CONTACTLESS CARD-BASED AUTHENTICATION VIA WEB-BROWSER

(71) Applicant: Capital One Services, LLC, McLean, VA (US)

(72) Inventors: Jeffrey Carlyle Wieker, Falls Church, VA (US); Paul Y. Moreton, Tuscaloosa, AL (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 18/333,941

(22) Filed: Jun. 13, 2023

(65) Prior Publication Data

US 2024/0422001 A1 Dec. 19, 2024

(51) Int. Cl.
*H04L 9/32* (2006.01)
*H04L 67/02* (2022.01)

(52) U.S. Cl.
CPC ............ *H04L 9/3234* (2013.01); *H04L 67/02* (2013.01)

(58) Field of Classification Search
CPC .............................. H04L 9/3234; H04L 67/02
USPC ............................................................. 726/9
See application file for complete search history.

(56) References Cited

U.S. PATENT DOCUMENTS

| | | | |
|---|---|---|---|
| 4,683,553 A | 7/1987 | Mollier | |
| 4,827,113 A | 5/1989 | Rikuna | |
| 4,910,773 A | 3/1990 | Hazard et al. | |
| 5,036,461 A | 7/1991 | Elliott et al. | |
| 5,363,448 A | 11/1994 | Koopman, Jr. et al. | |
| 5,377,270 A | 12/1994 | Koopman, Jr. et al. | |
| 5,533,126 A | 7/1996 | Hazard | |
| 5,537,314 A | 7/1996 | Kanter | |
| 5,592,553 A | 1/1997 | Guski et al. | |

(Continued)

FOREIGN PATENT DOCUMENTS

| | | |
|---|---|---|
| CA | 3010336 A1 | 7/2017 |
| CN | 101192295 A | 6/2008 |

(Continued)

OTHER PUBLICATIONS

EPICS: A Framework for Enforcing Security Policies in Composite Web Services, Ranchal et al, Jan. 2018, (Year: 2018).*

(Continued)

*Primary Examiner* — Jahangir Kabir
(74) *Attorney, Agent, or Firm* — KDW FIRM PLLC

(57) ABSTRACT

A computer-implemented method to enable short-range wireless communication via a webpage on a computing device includes receiving, via a web-browser executing on the computing device, from the webpage, a first request to execute a computer-executable instruction, the computer-executable instruction requests data from an enterprise server. The method also includes triggering, in response to a second request from the enterprise server to authenticate the first request, the web-browser to execute a predetermined computer program. The method also includes scanning, by the predetermined computer program a cryptogram from a contactless card to authenticate the cryptogram and cause the enterprise server to send the data. The method also includes executing, via the web-browser, the computer-executable instruction from the first request in response to receiving the data sent by the enterprise server.

24 Claims, 14 Drawing Sheets

(56) References Cited

U.S. PATENT DOCUMENTS

| | | |
|---|---|---|
| 5,616,901 A | 4/1997 | Crandall |
| 5,666,415 A | 9/1997 | Kaufman |
| 5,763,373 A | 6/1998 | Robinson et al. |
| 5,764,789 A | 6/1998 | Pare, Jr. et al. |
| 5,768,373 A | 6/1998 | Lohstroh et al. |
| 5,778,072 A | 7/1998 | Samar |
| 5,796,827 A | 8/1998 | Coppersmith et al. |
| 5,832,090 A | 11/1998 | Raspotnik |
| 5,883,810 A | 3/1999 | Franklin et al. |
| 5,901,874 A | 5/1999 | Deters |
| 5,929,413 A | 7/1999 | Gardner |
| 5,960,411 A | 9/1999 | Hartman et al. |
| 6,021,203 A | 2/2000 | Douceur et al. |
| 6,049,328 A | 4/2000 | Vanderheiden |
| 6,058,373 A | 5/2000 | Blinn et al. |
| 6,061,666 A | 5/2000 | Do et al. |
| 6,105,013 A | 8/2000 | Curry et al. |
| 6,199,114 B1 | 3/2001 | White et al. |
| 6,199,762 B1 | 3/2001 | Hohle |
| 6,216,227 B1 | 4/2001 | Goldstein et al. |
| 6,227,447 B1 | 5/2001 | Campisano |
| 6,282,522 B1 | 8/2001 | Davis et al. |
| 6,324,271 B1 | 11/2001 | Sawyer et al. |
| 6,342,844 B1 | 1/2002 | Rozin |
| 6,367,011 B1 | 4/2002 | Lee et al. |
| 6,402,028 B1 | 6/2002 | Graham, Jr. et al. |
| 6,438,550 B1 | 8/2002 | Doyle et al. |
| 6,501,847 B2 | 12/2002 | Helot et al. |
| 6,631,197 B1 | 10/2003 | Taenzer |
| 6,641,050 B2 | 11/2003 | Kelley et al. |
| 6,655,585 B2 | 12/2003 | Shinn |
| 6,662,020 B1 | 12/2003 | Aaro et al. |
| 6,721,706 B1 | 4/2004 | Strubbe et al. |
| 6,731,778 B1 | 5/2004 | Oda et al. |
| 6,779,115 B1 | 8/2004 | Naim |
| 6,792,533 B2 | 9/2004 | Jablon |
| 6,829,711 B1 | 12/2004 | Kwok et al. |
| 6,834,271 B1 | 12/2004 | Hodgson et al. |
| 6,834,795 B1 | 12/2004 | Rasmussen et al. |
| 6,852,031 B1 | 2/2005 | Rowe |
| 6,865,547 B1 | 3/2005 | Brake, Jr. et al. |
| 6,873,260 B2 | 3/2005 | Lancos et al. |
| 6,877,656 B1 | 4/2005 | Jaros et al. |
| 6,889,198 B2 | 5/2005 | Kawan |
| 6,905,411 B2 | 6/2005 | Nguyen et al. |
| 6,910,627 B1 | 6/2005 | Simpson-Young et al. |
| 6,971,031 B2 | 11/2005 | Haala |
| 6,990,588 B1 | 1/2006 | Yasukura |
| 7,006,986 B1 | 2/2006 | Sines et al. |
| 7,085,931 B1 | 8/2006 | Smith et al. |
| 7,127,605 B1 | 10/2006 | Montgomery et al. |
| 7,128,274 B2 | 10/2006 | Kelley et al. |
| 7,140,550 B2 | 11/2006 | Ramachandran |
| 7,152,045 B2 | 12/2006 | Hoffman |
| 7,165,727 B2 | 1/2007 | de Jong |
| 7,175,076 B1 | 2/2007 | Block et al. |
| 7,202,773 B1 | 4/2007 | Oba et al. |
| 7,206,806 B2 | 4/2007 | Pineau |
| 7,232,073 B1 | 6/2007 | de Jong |
| 7,246,752 B2 | 7/2007 | Brown |
| 7,254,569 B2 | 8/2007 | Goodman et al. |
| 7,263,507 B1 | 8/2007 | Brake, Jr. et al. |
| 7,270,276 B2 | 9/2007 | Vayssiere |
| 7,278,025 B2 | 10/2007 | Saito et al. |
| 7,287,692 B1 | 10/2007 | Patel et al. |
| 7,290,709 B2 | 11/2007 | Tsai et al. |
| 7,306,143 B2 | 12/2007 | Bonneau, Jr. et al. |
| 7,319,986 B2 | 1/2008 | Praisner et al. |
| 7,325,132 B2 | 1/2008 | Takayama et al. |
| 7,373,515 B2 | 5/2008 | Owen et al. |
| 7,374,099 B2 | 5/2008 | de Jong |
| 7,375,616 B2 | 5/2008 | Rowse et al. |
| 7,380,710 B2 | 6/2008 | Brown |
| 7,424,977 B2 | 9/2008 | Smets et al. |
| 7,453,439 B1 | 11/2008 | Kushler et al. |
| 7,472,829 B2 | 1/2009 | Brown |
| 7,487,357 B2 | 2/2009 | Smith et al. |
| 7,568,631 B2 | 8/2009 | Gibbs et al. |
| 7,584,153 B2 | 9/2009 | Brown et al. |
| 7,597,250 B2 | 10/2009 | Finn |
| 7,628,322 B2 | 12/2009 | Holtmanns et al. |
| 7,652,578 B2 | 1/2010 | Braun et al. |
| 7,689,832 B2 | 3/2010 | Talmor et al. |
| 7,703,142 B1 | 4/2010 | Wilson et al. |
| 7,748,609 B2 | 7/2010 | Sachdeva et al. |
| 7,748,617 B2 | 7/2010 | Gray |
| 7,748,636 B2 | 7/2010 | Finn |
| 7,762,457 B2 | 7/2010 | Bonalle et al. |
| 7,789,302 B2 | 9/2010 | Tame |
| 7,793,851 B2 | 9/2010 | Mullen |
| 7,796,013 B2 | 9/2010 | Murakami et al. |
| 7,801,799 B1 | 9/2010 | Brake, Jr. et al. |
| 7,801,829 B2 | 9/2010 | Gray et al. |
| 7,805,755 B2 | 9/2010 | Brown et al. |
| 7,809,643 B2 | 10/2010 | Phillips et al. |
| 7,827,115 B2 | 11/2010 | Weller et al. |
| 7,828,214 B2 | 11/2010 | Narendra et al. |
| 7,848,746 B2 | 12/2010 | Juels |
| 7,882,553 B2 | 2/2011 | Tuliani |
| 7,900,048 B2 | 3/2011 | Andersson |
| 7,908,216 B1 | 3/2011 | Davis et al. |
| 7,922,082 B2 | 4/2011 | Muscato |
| 7,933,589 B1 | 4/2011 | Mamdani et al. |
| 7,949,559 B2 | 5/2011 | Freiberg |
| 7,954,716 B2 | 6/2011 | Narendra et al. |
| 7,954,723 B2 | 6/2011 | Charrat |
| 7,962,369 B2 | 6/2011 | Rosenberg |
| 7,993,197 B2 | 8/2011 | Kaminkow |
| 8,005,426 B2 | 8/2011 | Huomo et al. |
| 8,010,405 B1 | 8/2011 | Bortolin et al. |
| RE42,762 E | 9/2011 | Shin et al. |
| 8,041,954 B2 | 10/2011 | Plesman |
| 8,060,012 B2 | 11/2011 | Sklovsky et al. |
| 8,074,877 B2 | 12/2011 | Mullen et al. |
| 8,082,450 B2 | 12/2011 | Frey et al. |
| 8,095,113 B2 | 1/2012 | Kean et al. |
| 8,099,332 B2 | 1/2012 | Lemay et al. |
| 8,103,249 B2 | 1/2012 | Markison |
| 8,108,687 B2 | 1/2012 | Ellis et al. |
| 8,127,143 B2 | 2/2012 | Abdallah et al. |
| 8,135,648 B2 | 3/2012 | Oram et al. |
| 8,140,010 B2 | 3/2012 | Symons et al. |
| 8,141,136 B2 | 3/2012 | Lee et al. |
| 8,150,321 B2 | 4/2012 | Winter et al. |
| 8,150,767 B2 | 4/2012 | Wankmueller |
| 8,186,602 B2 | 5/2012 | Itay et al. |
| 8,196,131 B1 | 6/2012 | von Behren et al. |
| 8,215,563 B2 | 7/2012 | Levy et al. |
| 8,224,753 B2 | 7/2012 | Atef et al. |
| 8,232,879 B2 | 7/2012 | Davis |
| 8,233,841 B2 | 7/2012 | Griffin et al. |
| 8,245,292 B2 | 8/2012 | Buer |
| 8,249,654 B1 | 8/2012 | Zhu |
| 8,266,451 B2 | 9/2012 | Leydier et al. |
| 8,285,329 B1 | 10/2012 | Zhu |
| 8,302,872 B2 | 11/2012 | Mullen |
| 8,312,519 B1 | 11/2012 | Bailey et al. |
| 8,316,237 B1 | 11/2012 | Felsher et al. |
| 8,332,272 B2 | 12/2012 | Fisher |
| 8,365,988 B1 | 2/2013 | Medina, III et al. |
| 8,369,960 B2 | 2/2013 | Tran et al. |
| 8,371,501 B1 | 2/2013 | Hopkins |
| 8,381,307 B2 | 2/2013 | Cimino |
| 8,391,719 B2 | 3/2013 | Alameh et al. |
| 8,417,231 B2 | 4/2013 | Sanding et al. |
| 8,439,271 B2 | 5/2013 | Smets et al. |
| 8,475,367 B1 | 7/2013 | Yuen et al. |
| 8,489,112 B2 | 7/2013 | Roeding et al. |
| 8,511,542 B2 | 8/2013 | Pan |
| 8,559,872 B2 | 10/2013 | Butler |
| 8,566,916 B1 | 10/2013 | Bailey et al. |
| 8,567,670 B2 | 10/2013 | Stanfield et al. |
| 8,572,386 B2 | 10/2013 | Takekawa et al. |
| 8,577,810 B1 | 11/2013 | Dalit et al. |

(56) References Cited

U.S. PATENT DOCUMENTS

| | | | |
|---|---|---|---|
| 8,583,454 | B2 | 11/2013 | Beraja et al. |
| 8,589,335 | B2 | 11/2013 | Smith et al. |
| 8,594,730 | B2 | 11/2013 | Bona et al. |
| 8,615,468 | B2 | 12/2013 | Varadarajan |
| 8,620,218 | B2 | 12/2013 | Awad |
| 8,667,285 | B2 | 3/2014 | Coulier et al. |
| 8,723,941 | B1 | 5/2014 | Shirbabadi et al. |
| 8,726,405 | B1 | 5/2014 | Bailey et al. |
| 8,740,073 | B2 | 6/2014 | Vijayshankar et al. |
| 8,750,514 | B2 | 6/2014 | Gallo et al. |
| 8,752,189 | B2 | 6/2014 | de Jong |
| 8,794,509 | B2 | 8/2014 | Bishop et al. |
| 8,799,668 | B2 | 8/2014 | Cheng |
| 8,806,592 | B2 | 8/2014 | Ganesan |
| 8,807,440 | B1 | 8/2014 | von Behren et al. |
| 8,811,892 | B2 | 8/2014 | Khan et al. |
| 8,814,039 | B2 | 8/2014 | Bishop et al. |
| 8,814,052 | B2 | 8/2014 | Bona et al. |
| 8,818,867 | B2 | 8/2014 | Baldwin et al. |
| 8,850,538 | B1 | 9/2014 | Vernon et al. |
| 8,861,733 | B2 | 10/2014 | Benteo et al. |
| 8,880,027 | B1 | 11/2014 | Darringer |
| 8,888,002 | B2 | 11/2014 | Marshall Chesney et al. |
| 8,898,088 | B2 | 11/2014 | Springer et al. |
| 8,934,837 | B2 | 1/2015 | Zhu et al. |
| 8,977,569 | B2 | 3/2015 | Rao |
| 8,994,498 | B2 | 3/2015 | Agrafioti et al. |
| 9,004,365 | B2 | 4/2015 | Bona et al. |
| 9,038,894 | B2 | 5/2015 | Khalid |
| 9,042,814 | B2 | 5/2015 | Royston et al. |
| 9,047,531 | B2 | 6/2015 | Showering et al. |
| 9,069,976 | B2 | 6/2015 | Toole et al. |
| 9,081,948 | B2 | 7/2015 | Magne |
| 9,104,853 | B2 | 8/2015 | Venkataramani et al. |
| 9,118,663 | B1 | 8/2015 | Bailey et al. |
| 9,122,964 | B2 | 9/2015 | Krawczewicz |
| 9,129,280 | B2 | 9/2015 | Bona et al. |
| 9,152,832 | B2 | 10/2015 | Royston et al. |
| 9,203,800 | B2 | 12/2015 | Izu et al. |
| 9,209,867 | B2 | 12/2015 | Royston |
| 9,251,330 | B2 | 2/2016 | Boivie et al. |
| 9,251,518 | B2 | 2/2016 | Levin et al. |
| 9,258,715 | B2 | 2/2016 | Borghei |
| 9,270,337 | B2 | 2/2016 | Zhu et al. |
| 9,306,626 | B2 | 4/2016 | Hall et al. |
| 9,306,942 | B1 | 4/2016 | Bailey et al. |
| 9,324,066 | B2 | 4/2016 | Archer et al. |
| 9,324,067 | B2 | 4/2016 | Van Os et al. |
| 9,332,587 | B2 | 5/2016 | Salahshoor |
| 9,338,622 | B2 | 5/2016 | Bjontegard |
| 9,373,141 | B1 | 6/2016 | Shakkarwar |
| 9,379,841 | B2 | 6/2016 | Fine et al. |
| 9,413,430 | B2 | 8/2016 | Royston et al. |
| 9,413,768 | B1 | 8/2016 | Gregg et al. |
| 9,420,496 | B1 | 8/2016 | Indurkar |
| 9,426,132 | B1 | 8/2016 | Alikhani |
| 9,432,339 | B1 | 8/2016 | Bowness |
| 9,455,968 | B1 | 9/2016 | Machani et al. |
| 9,473,509 | B2 | 10/2016 | Arsanjani et al. |
| 9,491,626 | B2 | 11/2016 | Sharma et al. |
| 9,553,637 | B2 | 1/2017 | Yang et al. |
| 9,619,952 | B1 | 4/2017 | Zhao et al. |
| 9,635,000 | B1 | 4/2017 | Muftic |
| 9,665,858 | B1 | 5/2017 | Kumar |
| 9,674,705 | B2 | 6/2017 | Rose et al. |
| 9,679,286 | B2 | 6/2017 | Colnot et al. |
| 9,680,942 | B2 | 6/2017 | Dimmick |
| 9,710,804 | B2 | 7/2017 | Zhou et al. |
| 9,740,342 | B2 | 8/2017 | Paulsen et al. |
| 9,740,988 | B1 | 8/2017 | Levin et al. |
| 9,763,097 | B2 | 9/2017 | Robinson et al. |
| 9,767,329 | B2 | 9/2017 | Forster |
| 9,769,662 | B1 | 9/2017 | Queru |
| 9,773,151 | B2 | 9/2017 | Mil'shtein et al. |
| 9,780,953 | B2 | 10/2017 | Gaddam et al. |
| 9,891,823 | B2 | 2/2018 | Feng et al. |
| 9,940,571 | B1 | 4/2018 | Herrington |
| 9,953,323 | B2 | 4/2018 | Candelore et al. |
| 9,961,194 | B1 | 5/2018 | Wiechman et al. |
| 9,965,756 | B2 | 5/2018 | Davis et al. |
| 9,965,911 | B2 | 5/2018 | Wishne |
| 9,978,058 | B2 | 5/2018 | Wurmfeld et al. |
| 10,043,164 | B2 | 8/2018 | Dogin et al. |
| 10,075,437 | B1 | 9/2018 | Costigan et al. |
| 10,129,648 | B1 | 11/2018 | Hernandez et al. |
| 10,133,979 | B1 | 11/2018 | Eidam et al. |
| 10,217,105 | B1 | 2/2019 | Sangi et al. |
| 10,255,601 | B2 * | 4/2019 | Makhotin .............. G06Q 20/40 |
| 2001/0010723 | A1 | 8/2001 | Pinkas |
| 2001/0029485 | A1 | 10/2001 | Brody et al. |
| 2001/0034702 | A1 | 10/2001 | Mockett et al. |
| 2001/0054003 | A1 | 12/2001 | Chien et al. |
| 2002/0078345 | A1 | 6/2002 | Sandhu et al. |
| 2002/0093530 | A1 | 7/2002 | Krothapalli et al. |
| 2002/0100808 | A1 | 8/2002 | Norwood et al. |
| 2002/0120583 | A1 | 8/2002 | Keresman, III et al. |
| 2002/0152116 | A1 | 10/2002 | Yan et al. |
| 2002/0153424 | A1 | 10/2002 | Li |
| 2002/0165827 | A1 | 11/2002 | Gien et al. |
| 2003/0023554 | A1 | 1/2003 | Yap et al. |
| 2003/0034873 | A1 | 2/2003 | Chase et al. |
| 2003/0055727 | A1 | 3/2003 | Walker et al. |
| 2003/0078882 | A1 | 4/2003 | Sukeda et al. |
| 2003/0167350 | A1 | 9/2003 | Davis et al. |
| 2003/0208449 | A1 | 11/2003 | Diao |
| 2004/0015958 | A1 | 1/2004 | Veil et al. |
| 2004/0039919 | A1 | 2/2004 | Takayama et al. |
| 2004/0127256 | A1 | 7/2004 | Goldthwaite et al. |
| 2004/0215674 | A1 | 10/2004 | Odinak et al. |
| 2004/0230799 | A1 | 11/2004 | Davis |
| 2005/0044367 | A1 | 2/2005 | Gasparini et al. |
| 2005/0075985 | A1 | 4/2005 | Cartmell |
| 2005/0081038 | A1 | 4/2005 | Arditti Modiano et al. |
| 2005/0138387 | A1 | 6/2005 | Lam et al. |
| 2005/0156026 | A1 | 7/2005 | Ghosh et al. |
| 2005/0160049 | A1 | 7/2005 | Lundholm |
| 2005/0195975 | A1 | 9/2005 | Kawakita |
| 2005/0247797 | A1 | 11/2005 | Ramachandran |
| 2006/0006230 | A1 | 1/2006 | Bear et al. |
| 2006/0040726 | A1 | 2/2006 | Szrek et al. |
| 2006/0041402 | A1 | 2/2006 | Baker |
| 2006/0044153 | A1 | 3/2006 | Dawidowsky |
| 2006/0047954 | A1 | 3/2006 | Sachdeva et al. |
| 2006/0085848 | A1 | 4/2006 | Aissi et al. |
| 2006/0136334 | A1 | 6/2006 | Atkinson et al. |
| 2006/0173985 | A1 | 8/2006 | Moore |
| 2006/0174331 | A1 | 8/2006 | Schuetz |
| 2006/0242698 | A1 | 10/2006 | Inskeep et al. |
| 2006/0280338 | A1 | 12/2006 | Rabb |
| 2007/0033642 | A1 | 2/2007 | Ganesan et al. |
| 2007/0055630 | A1 | 3/2007 | Gauthier et al. |
| 2007/0061266 | A1 | 3/2007 | Moore et al. |
| 2007/0061487 | A1 | 3/2007 | Moore et al. |
| 2007/0116292 | A1 | 5/2007 | Kurita et al. |
| 2007/0118745 | A1 | 5/2007 | Buer |
| 2007/0197261 | A1 | 8/2007 | Humbel |
| 2007/0224969 | A1 | 9/2007 | Rao |
| 2007/0241182 | A1 | 10/2007 | Buer |
| 2007/0256134 | A1 | 11/2007 | Lehtonen et al. |
| 2007/0258594 | A1 | 11/2007 | Sandhu et al. |
| 2007/0278291 | A1 | 12/2007 | Rans et al. |
| 2008/0008315 | A1 | 1/2008 | Fontana et al. |
| 2008/0010217 | A1 | 1/2008 | Hobson et al. |
| 2008/0011831 | A1 | 1/2008 | Bonalle et al. |
| 2008/0014867 | A1 | 1/2008 | Finn |
| 2008/0035738 | A1 | 2/2008 | Mullen |
| 2008/0071681 | A1 | 3/2008 | Khalid |
| 2008/0072303 | A1 | 3/2008 | Syed |
| 2008/0086767 | A1 | 4/2008 | Kulkarni et al. |
| 2008/0103968 | A1 | 5/2008 | Bies et al. |
| 2008/0109309 | A1 | 5/2008 | Andau et al. |
| 2008/0110983 | A1 | 5/2008 | Ashfield |
| 2008/0120711 | A1 | 5/2008 | Dispensa |
| 2008/0156873 | A1 | 7/2008 | Wilhelm et al. |

(56) References Cited

U.S. PATENT DOCUMENTS

| | | |
|---|---|---|
| 2008/0162312 A1 | 7/2008 | Sklovsky et al. |
| 2008/0164308 A1 | 7/2008 | Aaron et al. |
| 2008/0207307 A1 | 8/2008 | Cunningham, II et al. |
| 2008/0209543 A1 | 8/2008 | Aaron |
| 2008/0223918 A1 | 9/2008 | Williams et al. |
| 2008/0285746 A1 | 11/2008 | Androck et al. |
| 2008/0308641 A1 | 12/2008 | Finn |
| 2009/0037275 A1 | 2/2009 | Pollio |
| 2009/0048026 A1 | 2/2009 | French |
| 2009/0132417 A1 | 5/2009 | Scipioni et al. |
| 2009/0143104 A1 | 6/2009 | Loh et al. |
| 2009/0171682 A1 | 7/2009 | Dixon et al. |
| 2009/0210308 A1 | 8/2009 | Toomer et al. |
| 2009/0235339 A1 | 9/2009 | Mennes et al. |
| 2009/0249077 A1 | 10/2009 | Gargaro et al. |
| 2009/0282264 A1 | 11/2009 | Ameil et al. |
| 2010/0023449 A1 | 1/2010 | Skowronek et al. |
| 2010/0023455 A1 | 1/2010 | Dispensa et al. |
| 2010/0029202 A1 | 2/2010 | Jolivet et al. |
| 2010/0033310 A1 | 2/2010 | Narendra et al. |
| 2010/0036769 A1 | 2/2010 | Winters et al. |
| 2010/0078471 A1 | 4/2010 | Lin et al. |
| 2010/0082491 A1 | 4/2010 | Rosenblatt et al. |
| 2010/0094754 A1 | 4/2010 | Bertran et al. |
| 2010/0095130 A1 | 4/2010 | Bertran et al. |
| 2010/0100480 A1 | 4/2010 | Altman et al. |
| 2010/0114731 A1 | 5/2010 | Kingston et al. |
| 2010/0114773 A1 | 5/2010 | Skowronek |
| 2010/0192230 A1 | 7/2010 | Steeves et al. |
| 2010/0207742 A1 | 8/2010 | Buhot et al. |
| 2010/0211797 A1 | 8/2010 | Westerveld et al. |
| 2010/0240413 A1 | 9/2010 | He et al. |
| 2010/0257357 A1 | 10/2010 | McClain |
| 2010/0312634 A1 | 12/2010 | Cervenka |
| 2010/0312635 A1 | 12/2010 | Cervenka |
| 2011/0028160 A1 | 2/2011 | Roeding et al. |
| 2011/0035604 A1 | 2/2011 | Habraken |
| 2011/0060631 A1 | 3/2011 | Grossman et al. |
| 2011/0068170 A1 | 3/2011 | Lehman |
| 2011/0084132 A1 | 4/2011 | Tofighbakhsh |
| 2011/0101093 A1 | 5/2011 | Ehrensvard |
| 2011/0113245 A1 | 5/2011 | Varadarajan |
| 2011/0125638 A1 | 5/2011 | Davis et al. |
| 2011/0131415 A1 | 6/2011 | Schneider |
| 2011/0153437 A1 | 6/2011 | Archer et al. |
| 2011/0153496 A1 | 6/2011 | Royyuru |
| 2011/0208658 A1 | 8/2011 | Makhotin |
| 2011/0208965 A1 | 8/2011 | Machani |
| 2011/0211219 A1 | 9/2011 | Bradley et al. |
| 2011/0218911 A1 | 9/2011 | Spodak |
| 2011/0238564 A1 | 9/2011 | Lim et al. |
| 2011/0246780 A1 | 10/2011 | Yeap et al. |
| 2011/0258452 A1 | 10/2011 | Coulier et al. |
| 2011/0280406 A1 | 11/2011 | Ma et al. |
| 2011/0282785 A1 | 11/2011 | Chin |
| 2011/0294418 A1 | 12/2011 | Chen |
| 2011/0312271 A1 | 12/2011 | Ma et al. |
| 2012/0024947 A1 | 2/2012 | Naelon |
| 2012/0030047 A1 | 2/2012 | Fuentes et al. |
| 2012/0030121 A1 | 2/2012 | Grellier |
| 2012/0047071 A1 | 2/2012 | Mullen et al. |
| 2012/0079281 A1 | 3/2012 | Lowenstein et al. |
| 2012/0109735 A1 | 5/2012 | Krawczewicz et al. |
| 2012/0109764 A1 | 5/2012 | Martin et al. |
| 2012/0143754 A1 | 6/2012 | Patel |
| 2012/0150737 A1 | 6/2012 | Rottink et al. |
| 2012/0178366 A1 | 7/2012 | Levy et al. |
| 2012/0196583 A1 | 8/2012 | Kindo |
| 2012/0207305 A1 | 8/2012 | Gallo et al. |
| 2012/0209773 A1 | 8/2012 | Ranganathan |
| 2012/0238206 A1 | 9/2012 | Singh et al. |
| 2012/0239560 A1 | 9/2012 | Pourfallah et al. |
| 2012/0252350 A1 | 10/2012 | Steinmetz et al. |
| 2012/0254394 A1 | 10/2012 | Barras |
| 2012/0284194 A1 | 11/2012 | Liu et al. |
| 2012/0290472 A1 | 11/2012 | Mullen et al. |
| 2012/0296818 A1 | 11/2012 | Nuzzi et al. |
| 2012/0316992 A1 | 12/2012 | Oborne |
| 2012/0317035 A1 | 12/2012 | Royyuru et al. |
| 2012/0317628 A1 | 12/2012 | Yeager |
| 2013/0005245 A1 | 1/2013 | Royston |
| 2013/0008956 A1 | 1/2013 | Ashfield |
| 2013/0026229 A1 | 1/2013 | Jarman et al. |
| 2013/0048713 A1 | 2/2013 | Pan |
| 2013/0054474 A1 | 2/2013 | Yeager |
| 2013/0065564 A1 | 3/2013 | Conner et al. |
| 2013/0080228 A1 | 3/2013 | Fisher |
| 2013/0080229 A1 | 3/2013 | Fisher |
| 2013/0099587 A1 | 4/2013 | Lou et al. |
| 2013/0104251 A1 | 4/2013 | Moore et al. |
| 2013/0106576 A1 | 5/2013 | Hinman et al. |
| 2013/0119130 A1 | 5/2013 | Braams |
| 2013/0130614 A1 | 5/2013 | Busch-Sorensen |
| 2013/0144793 A1 | 6/2013 | Royston |
| 2013/0171929 A1 | 7/2013 | Adams et al. |
| 2013/0179351 A1 | 7/2013 | Wallner |
| 2013/0185772 A1 | 7/2013 | Jaudon et al. |
| 2013/0191279 A1 | 7/2013 | Calman et al. |
| 2013/0200999 A1 | 8/2013 | Spodak et al. |
| 2013/0216108 A1 | 8/2013 | Hwang et al. |
| 2013/0226791 A1 | 8/2013 | Springer et al. |
| 2013/0226796 A1 | 8/2013 | Jiang et al. |
| 2013/0232082 A1 | 9/2013 | Krawczewicz et al. |
| 2013/0238894 A1 | 9/2013 | Ferg et al. |
| 2013/0282360 A1 | 10/2013 | Shimota et al. |
| 2013/0303085 A1 | 11/2013 | Boucher et al. |
| 2013/0304651 A1 | 11/2013 | Smith |
| 2013/0312073 A1 | 11/2013 | Srivastav |
| 2013/0312082 A1 | 11/2013 | Izu et al. |
| 2013/0314593 A1 | 11/2013 | Reznik et al. |
| 2013/0344857 A1 | 12/2013 | Berionne et al. |
| 2014/0002238 A1 | 1/2014 | Taveau et al. |
| 2014/0019352 A1 | 1/2014 | Shrivastava |
| 2014/0027506 A1 | 1/2014 | Heo et al. |
| 2014/0032409 A1 | 1/2014 | Rosano |
| 2014/0032410 A1 | 1/2014 | Georgiev et al. |
| 2014/0040120 A1 | 2/2014 | Cho et al. |
| 2014/0040139 A1 | 2/2014 | Brudnicki et al. |
| 2014/0040147 A1 | 2/2014 | Varadarakan et al. |
| 2014/0047235 A1 | 2/2014 | Lessiak et al. |
| 2014/0067690 A1 | 3/2014 | Pitroda et al. |
| 2014/0074637 A1 | 3/2014 | Hammad |
| 2014/0074655 A1 | 3/2014 | Lim et al. |
| 2014/0081720 A1 | 3/2014 | Wu |
| 2014/0138435 A1 | 5/2014 | Khalid |
| 2014/0171034 A1 | 6/2014 | Aleksin et al. |
| 2014/0171039 A1 | 6/2014 | Bjontegard |
| 2014/0172700 A1 | 6/2014 | Teuwen et al. |
| 2014/0180851 A1 | 6/2014 | Fisher |
| 2014/0208112 A1 | 7/2014 | McDonald et al. |
| 2014/0214674 A1 | 7/2014 | Narula |
| 2014/0229375 A1 | 8/2014 | Zaytzsev et al. |
| 2014/0245391 A1 | 8/2014 | Adenuga |
| 2014/0256251 A1 | 9/2014 | Caceres et al. |
| 2014/0258099 A1 | 9/2014 | Rosano |
| 2014/0258113 A1 | 9/2014 | Gauthier et al. |
| 2014/0258125 A1 | 9/2014 | Gerber et al. |
| 2014/0274179 A1 | 9/2014 | Zhu et al. |
| 2014/0279479 A1 | 9/2014 | Maniar et al. |
| 2014/0337235 A1 | 11/2014 | Van Heerden et al. |
| 2014/0339315 A1 | 11/2014 | Ko |
| 2014/0346860 A1 | 11/2014 | Aubry et al. |
| 2014/0365780 A1 | 12/2014 | Movassaghi |
| 2014/0379361 A1 | 12/2014 | Mahadkar et al. |
| 2015/0012444 A1 | 1/2015 | Brown et al. |
| 2015/0032635 A1 | 1/2015 | Guise |
| 2015/0071486 A1 | 3/2015 | Rhoads et al. |
| 2015/0088756 A1 | 3/2015 | Makhotin et al. |
| 2015/0088757 A1 | 3/2015 | Zhou et al. |
| 2015/0089586 A1 | 3/2015 | Ballesteros |
| 2015/0134452 A1 | 5/2015 | Williams |
| 2015/0140960 A1 | 5/2015 | Powell et al. |
| 2015/0154595 A1 | 6/2015 | Collinge et al. |
| 2015/0170138 A1 | 6/2015 | Rao |

(56) References Cited

U.S. PATENT DOCUMENTS

| | | |
|---|---|---|
| 2015/0178724 A1 | 6/2015 | Ngo et al. |
| 2015/0186871 A1 | 7/2015 | Laracey |
| 2015/0205379 A1 | 7/2015 | Mag et al. |
| 2015/0302409 A1 | 10/2015 | Malek et al. |
| 2015/0317626 A1 | 11/2015 | Ran et al. |
| 2015/0332266 A1 | 11/2015 | Friedlander et al. |
| 2015/0339474 A1 | 11/2015 | Paz et al. |
| 2015/0371234 A1 | 12/2015 | Huang et al. |
| 2016/0012465 A1 | 1/2016 | Sharp |
| 2016/0026997 A1 | 1/2016 | Tsui et al. |
| 2016/0048913 A1 | 2/2016 | Rausaria et al. |
| 2016/0055480 A1 | 2/2016 | Shah |
| 2016/0057619 A1 | 2/2016 | Lopez |
| 2016/0065370 A1 | 3/2016 | Le Saint et al. |
| 2016/0087957 A1 | 3/2016 | Shah et al. |
| 2016/0092696 A1 | 3/2016 | Guglani et al. |
| 2016/0148193 A1 | 5/2016 | Kelley et al. |
| 2016/0232523 A1 | 8/2016 | Venot et al. |
| 2016/0239672 A1 | 8/2016 | Khan et al. |
| 2016/0253651 A1 | 9/2016 | Park et al. |
| 2016/0255072 A1 | 9/2016 | Liu |
| 2016/0267486 A1 | 9/2016 | Mitra et al. |
| 2016/0277383 A1 | 9/2016 | Guyomarc'H et al. |
| 2016/0277388 A1 | 9/2016 | Lowe et al. |
| 2016/0307187 A1 | 10/2016 | Guo et al. |
| 2016/0307189 A1 | 10/2016 | Zarakas et al. |
| 2016/0314472 A1 | 10/2016 | Ashfield |
| 2016/0330027 A1 | 11/2016 | Ebrahimi |
| 2016/0335531 A1 | 11/2016 | Mullen et al. |
| 2016/0379217 A1 | 12/2016 | Hammad |
| 2017/0004502 A1 | 1/2017 | Quentin et al. |
| 2017/0011395 A1 | 1/2017 | Pillai et al. |
| 2017/0011406 A1 | 1/2017 | Tunnell et al. |
| 2017/0017957 A1 | 1/2017 | Radu |
| 2017/0017964 A1 | 1/2017 | Janefalkar et al. |
| 2017/0024716 A1 | 1/2017 | Jiam et al. |
| 2017/0039566 A1 | 2/2017 | Schipperheijn |
| 2017/0041759 A1 | 2/2017 | Gantert et al. |
| 2017/0068950 A1 | 3/2017 | Kwon |
| 2017/0103388 A1 | 4/2017 | Pillai et al. |
| 2017/0104739 A1 | 4/2017 | Lansler et al. |
| 2017/0109509 A1 | 4/2017 | Baghdasaryan |
| 2017/0109730 A1 | 4/2017 | Locke et al. |
| 2017/0116447 A1 | 4/2017 | Cimino et al. |
| 2017/0124568 A1 | 5/2017 | Moghadam |
| 2017/0140379 A1 | 5/2017 | Deck |
| 2017/0154328 A1 | 6/2017 | Zarakas et al. |
| 2017/0154333 A1 | 6/2017 | Gleeson et al. |
| 2017/0180134 A1 | 6/2017 | King |
| 2017/0230189 A1 | 8/2017 | Toll et al. |
| 2017/0237301 A1 | 8/2017 | Elad et al. |
| 2017/0289127 A1 | 10/2017 | Hendrick |
| 2017/0295013 A1 | 10/2017 | Claes |
| 2017/0316696 A1 | 11/2017 | Bartel |
| 2017/0317834 A1 | 11/2017 | Smith et al. |
| 2017/0330173 A1 | 11/2017 | Woo et al. |
| 2017/0374070 A1 | 12/2017 | Shah et al. |
| 2018/0034507 A1 | 2/2018 | Wobak et al. |
| 2018/0039986 A1 | 2/2018 | Essebag et al. |
| 2018/0068316 A1 | 3/2018 | Essebag et al. |
| 2018/0129945 A1 | 5/2018 | Saxena et al. |
| 2018/0160255 A1 | 6/2018 | Park |
| 2018/0191501 A1 | 7/2018 | Lindemann |
| 2018/0205712 A1 | 7/2018 | Versteeg et al. |
| 2018/0240106 A1 | 8/2018 | Garrett et al. |
| 2018/0254909 A1 | 9/2018 | Hancock |
| 2018/0268132 A1 | 9/2018 | Buer et al. |
| 2018/0270214 A1 | 9/2018 | Caterino et al. |
| 2018/0294959 A1 | 10/2018 | Traynor et al. |
| 2018/0300716 A1 | 10/2018 | Carlson |
| 2018/0302396 A1 | 10/2018 | Camenisch et al. |
| 2018/0315050 A1 | 11/2018 | Hammad |
| 2018/0316666 A1 | 11/2018 | Koved et al. |
| 2018/0322486 A1 | 11/2018 | Deliwala et al. |
| 2018/0359100 A1 | 12/2018 | Gaddam et al. |
| 2019/0014107 A1 | 1/2019 | George |
| 2019/0019375 A1 | 1/2019 | Foley |
| 2019/0036678 A1 | 1/2019 | Ahmed |
| 2019/0238517 A1 | 8/2019 | D'Agostino et al. |
| 2020/0250672 A1* | 8/2020 | Rule ................... G06Q 20/382 |
| 2022/0272083 A1* | 8/2022 | Rule ................... H04L 63/0876 |
| 2022/0353084 A1 | 11/2022 | Venable |

FOREIGN PATENT DOCUMENTS

| | | |
|---|---|---|
| CN | 103023643 A | 4/2013 |
| CN | 103417202 A | 12/2013 |
| EP | 1085424 A1 | 3/2001 |
| EP | 1223565 A1 | 7/2002 |
| EP | 1265186 A2 | 12/2002 |
| EP | 1783919 A1 | 5/2007 |
| EP | 2139196 A1 | 12/2009 |
| EP | 1469419 A1 | 8/2012 |
| EP | 2852070 A1 | 3/2015 |
| GB | 2457221 A | 8/2009 |
| GB | 2516861 A | 2/2015 |
| GB | 2551907 A | 1/2018 |
| KR | 101508320 B1 | 4/2015 |
| WO | 0049586 A1 | 8/2000 |
| WO | 2006070189 A2 | 7/2006 |
| WO | 2008055170 A2 | 5/2008 |
| WO | 2009025605 A2 | 2/2009 |
| WO | 2010049252 A1 | 5/2010 |
| WO | 2011112158 A1 | 9/2011 |
| WO | 2012001624 A1 | 1/2012 |
| WO | 2013039395 A1 | 3/2013 |
| WO | 2013155562 A1 | 10/2013 |
| WO | 2013192358 A2 | 12/2013 |
| WO | 2014043278 A1 | 3/2014 |
| WO | 2014170741 A2 | 10/2014 |
| WO | 2015179649 A1 | 11/2015 |
| WO | 2015183818 A1 | 12/2015 |
| WO | 2016097718 A1 | 6/2016 |
| WO | 2016160816 A1 | 10/2016 |
| WO | 2016168394 A1 | 10/2016 |
| WO | 2017042375 A1 | 3/2017 |
| WO | 2017042400 A1 | 3/2017 |
| WO | 2017157859 A1 | 9/2017 |
| WO | 2017208063 A1 | 12/2017 |
| WO | 2018063809 A1 | 4/2018 |
| WO | 2018137888 A1 | 8/2018 |

OTHER PUBLICATIONS

Batina, L. and Poll, E., "SmartCards and RFID", Course PowerPoint Presentation for IPA Security Course, Digital Security at University of Nijmegen, Netherlands (date unknown) 75 pages.

Haykin, M. and Warnar, R., "Smart Card Technology: New Methods for Computer Access Control", Computer Science and Technology NIST Special Publication 500-157:1-60 (1988).

Lehpamer, H., "Component of the RFID System", RFID Design Principles, 2nd edition pp. 133-201 (2012).

Author Unknown, "CardrefresherSM from American Express®", [online] 2019 [retrieved on Mar. 25, 2019]. Retrieved from Internet URL: https://merchant-channel.americanexpress.com/merchant/en_US/cardrefresher, 2 pages.

Author Unknown, "Add Account Updater to your recurring payment tool", [online] 2018-19 [retrieved on Mar. 25, 2019]. Retrieved from Internet URL: https://www.authorize.net/our-features/account-updater/, 5 pages.

Author Unknown, "Visa® Account Updater for Merchants", [online] 2019 [retrieved on Mar. 25, 2019]. Retrieved from Internet URL: https://usa.visa.com/dam/VCOM/download/merchants/visa-account-updater-product-information-fact-sheet-for-merchants.pdf, 2 pages.

Author Unknown, "Manage the cards that you use with Apple Pay", Apple Support [online] 2019 [retrieved on Mar. 25, 2019]. Retrieved from Internet URL: https://support.apple.com/en-us/HT205583, 5 pages.

Author Unknown, "Contactless Specifications for Payment Systems", EMV Book B—Entry Point Specification [online] 2016

(56) References Cited

OTHER PUBLICATIONS

[retrieved on Mar. 25, 2019]. Retrieved from Internet URL: https://www.emvco.com/wp-content/uploads/2017/05/BookB_Entry_Point_Specification_v2_6_20160809023257319.pdf, 52 pages.

Author Unknown, "EMV Integrated Circuit Card Specifcations for Payment Systems, Book 2, Security and Key Management," Version 3.4, [online] 2011 [retrieved on Mar. 25, 2019]. Retrieved from Internet URL: https://www.emvco.com/wp-content/uploads/2017/05/EMV_v4.3_Book_2_Security_and_Key_Management_20120607061923900.pdf, 174 pages.

Author Unknown, "NFC Guide: All You Need to Know About Near Field Communication", Square Guide [online] 2018 [retrieved on Nov. 13, 2018]. Retrieved from Internet URL: https://squareup.com/guides/nfc, 8 pages.

Profis, S., "Everything you need to know about NFC and mobile payments" CNET Directory [online], 2014 [retrieved on Mar. 25, 2019]. Retrieved from the Internet URL: https://www.cnet.com/how-to/how-nfc-works-and-mobile-payments/, 6 pages.

Cozma, N., "Copy data from other devices in Android 5.0 Lollipop setup", CNET Directory [online] 2014 [retrieved on Mar. 25, 2019]. Retrieved from the Internet URL: https://www.cnet.com/how-to/copy-data-from-other-devices-in-android-5-0-lollipop-setup/, 5 pages.

Kevin, Android Enthusiast, "How to copy text string from nfc tag", StackExchange [online] 2013 [retrieved on Mar. 25, 2019]. Retrieved from the Internet URL: https://android.stackexchange.com/questions/55689/how-to-copy-text-string-from-nfc-tag, 11 pages.

Author Unknown, "Tap & Go Device Setup", Samsung [online] date unknown [retrieved on Mar. 25, 2019]. Retrieved from the Internet URL: https://www.samsung.com/us/switch-me/switch-to-the-galaxy-s-5/app/partial/setup-device/tap-go.html, 1 page.

Author Unknown, "Multiple encryption", Wikipedia [online] 2019 [retrieved on Mar. 25, 2019]. Retrieved from Internet URL: https://en.wikipedia.org/wiki/Multiple_encryption, 4 pages.

Krawczyk, et al., "HMAC: Keyed-Hashing for Message Authentication", Network Working Group RFC:2104 memo [online] 1997 [retrieved on Mar. 25, 2019]. Retrieved from Internet URL: https://tools.ietf.org/html/rfc2104, 12 pages.

Song, et al., " The AES-CMAC Algorithm", Network Working Group RFC: 4493 memo [online] 2006 [retrieved on Mar. 25, 2019]. Retrieved from Internet URL: https://tools.ietf.org/html/rfc4493, 21 pages.

Katz, J. and Lindell, Y., "Aggregate Message Authentication Codes", Topics in Cryptology [online] 2008 [retrieved on Mar. 25, 2019]. Retrieved from Internet URL: https://www.cs.umd.edu/~jkatz/papers/aggregateMAC.pdf, 11 pages.

Adams, D., and Maier, A-K., "Goldbug Big Seven open source crypto-messengers to be compared—or: Comprehensive Confidentiality Review & Audit of GoldBug Encrypting E-Mail-Client & Secure Instant Messenger", Big Seven Study 2016 [online] [retrieved on Mar. 25, 2018]. Retrieved from Internet URL: https://sf.net/projects/goldbug/files/bigseven-crypto-audit.pdf, 309 pages.

Author Unknown, "Triple DES", Wikipedia [online] 2018 [retrieved on Mar. 25, 2019]. Retrieved from Internet URL: https://simple.wikipedia.org/wiki/Triple_DES, 2 pages.

Song F., and Yun, A.I., "Quantum Security of NMAC and Related Constructions—PRF domain extension against quantum attacks", IACR Cryptology ePrint Archive [online] 2017 [retrieved on Mar. 25, 2019]. Retrieved from Internet URL: https://eprint.iacr.org/2017/509.pdf, 41 pages.

Saxena, N., "Lecture 10: NMAC, HMAC and Number Theory", CS 6903 Modern Cryptography [online] 2008 [retrieved on Mar. 25, 2019]. Retrieved from Internet URL: http://isis.poly.edu/courses/cs6903/Lectures/lecture 10.pdf, 8 pages.

Berg, G., "Fundamentals of EMV", Smart Card Alliance [online] date unknown [retrieved on Mar. 27, 2019]. Retrieveed from Internet URL: https://www.securetechalliance.org/resources/media/scap13_preconference/02.pdf, 37 pages.

Pierce, K., "Is the amazon echo nfc compatible?", Amazon.com Customer Q&A [online] 2016 [retrieved on Mar. 26, 2019]. Retrieved from Internet URL: https://www.amazon.com/ask/questions/Tx1RJXYSPE6XLJD?_ encodi . . . , 2 pages.

Author Unknown, "Multi-Factor Authentication", idaptive [online] 2019 [retrieved on Mar. 25, 2019]. Retrieved from Internet URL: https://www.centrify.com/products/application-services/adaptive-multi-factor-authentication/risk-based-mfa/, 10 pages.

Author Unknown, "Adaptive Authentication", SecureAuth [online] 2019 [retrieved on Mar. 25, 2019}. Retrieved from Internet URL: https://www.secureauth.com/products/access-management/adaptive-authentication, 7 pages.

Van den Breekel, J., et al., "EMV in a nutshell", Technical Report, 2016 [retrieved on Mar. 25, 2019]. Retrieved from Internet URL: https://www.cs.ru.nl/E.Poll/papers/EMVtechreport.pdf, 37 pages.

Author Unknown, "Autofill", Computer Hope [online] 2018 [retrieved on Mar. 25, 2019]. Retrieved from Internet URL: https://www.computerhope.com/jargon/a/autofill.htm, 2 pages.

Author Unknown, "Fill out forms automatically", Google Chrome Help [online] 2019 [retrieved on Mar. 25, 2019]. Retrieved from Internet URL: https://support.google.com/chrome/answer/ 142893?co=GENIE.Platform%3DDesktop&hl=en, 3 pages.

Author Unknown, "Autofill credit cards, contacts, and passwords in Safari on Mac", Apple Safari User Guide [online] 2019 [retrieved on Mar. 25, 2019]. Retrieved from Internet URL: https://support.apple.com/guide/safari/use-autofill-brw1103/mac, 3 pages.

Menghin, M.J., "Power Optimization Techniques for Near Field Communication Systems", 2014 Dissertation at Technical University of Graz [online]. Retrieved from Internet URL: https://diglib.tugraz.at/download.php?d=576a7b910d2d6&location=browse, 135 pages.

Mareli, M., et al., "Experimental evaluation of NFC reliability between an RFID tag and a smartphone", Conference paper (2013) IEEE AFRICON At Mauritius [online] [retrieved on Mar. 25, 2019]. Retrieved from Internet URL: https://core.ac.uk/download/pdf/54204839.pdf, 5 pages.

Davison, A., et al., "MonoSLAM: Real-Time Single Camera SLAM", IEEE Transactions on Pattern Analysis and Machine Intelligence 29(6): 1052-1067 (2007).

Barba, R., "Sharing your location with your bank sounds creepy, but it's also useful", Bankrate, LLC [online] 2017 [retrieved on Mar. 25, 2019]. Retrieved from Internet URL: https://www.bankrate.com/banking/banking-app-location-sharing/, 6 pages.

Author Unknown: "onetappayment™", [online] Jan. 24, 2019, [retrieved on Mar. 25, 2019]. Retrieved from Internet URL: https://www.payubiz.in/onetap, 4 pages.

Vu, et al., "Distinguishing users with capacitive touch communication", Proceedings of the Annual International Conference on Mobile Computing and Networking, 2012, MOBICOM. 10.1145/2348543.2348569.

Pourghomi, P., et al., "A Proposed NFC Payment Application," International Journal of Advanced Computer Science and Applications, 4(8):173-181 (2013).

Author unknown, "EMV Card Personalization Specification", EMVCo., LLC., specification version 1.0, (2003) 81 pages.

Ullmann et al., "On-Card" User Authentication for Contactless Smart Cards based on Gesture Recognition, paper presentation LNI proceedings, (2012) 12 pages.

Faraj, S.T., et al., "Investigation of Java Smart Card Technology for Multi-Task Applications", J of Al-Anbar University for Pure Science, 2(1):23 pages (2008).

Dhamdhere, P., "Key Benefits of a Unified Platform for Loyalty, Referral Marketing, and UGC" Annex Cloud [online] May 19, 2017 [retrieved on Jul. 3, 2019]. Retrieved from Internet URL: https://www.annexcloude.com/blog/benefits-unified-platform/, 13 pages.

The International Search Report and Written Opinion mailed Sep. 5, 2024, for corresponding PCT/US24/33408 (10 pages).

* cited by examiner

CONTACTLESS CARD-BASED AUTHENTICATION VIA WEB-BROWSER

BACKGROUND

Authenticating a user involved in the operations is vital during several online functions, such as login transactions, payment transactions, document signing transactions, etc. Contactless cards are frequently used for such verification. Contactless cards are based on radio-frequency identification (RFID) technology that may be embedded into credit cards, identification cards, and other smart cards. This technology allows users to make online transactions, such as credit card transactions, identification transactions, etc., by performing certain gestures, such as bringing an assigned smart card within a specific distance of (or tapping on) specific areas of devices, such as point-of-sale terminals, mobile phones, etc. Such gestures enable the transfer of certain data for the purposes of completing the online operation(s). Before employing such gesture-based features, the devices, cards, etc., having such capability must be appropriately activated. However, existing authentication processes are limited to using specific applications, restricting access to certain portals and functions.

BRIEF SUMMARY

One general aspect includes a computer-implemented method to enable short-range wireless communication via a webpage on a computing device. The computer-implemented method includes receiving, via a web-browser executing on the computing device, from the webpage, a first request to execute a computer-executable instruction, the computer-executable instruction requests data from an enterprise server. The method also includes receiving, from the enterprise server, a second request to authenticate the first request from the webpage. The method also includes triggering, in response to the second request from the enterprise server, the web-browser to execute a predetermined computer program. The method also includes scanning, by the predetermined computer program, using a short-range wireless communication module of the computing device, a cryptogram from a contactless card. The method also includes in response to determining that the first request is authentic based on the cryptogram, transmitting, by the predetermined computer program, a response to the enterprise server causing the enterprise server to send the data. The method also includes executing, via the web-browser, the computer-executable instruction from the first request in response to receiving the data sent by the enterprise server. Other embodiments of this aspect include corresponding computer systems, apparatus, and computer programs recorded on one or more computer storage devices, each configured to perform the actions of the methods.

One general aspect includes a computer device that includes a memory and a processor, the memory storing instructions that, when executed by the processor, configure the computing device to receive, via a web-browser executing on the computing device, from a webpage, a first request to execute a computer-executable instruction, the computer-executable instruction requests data from an enterprise server. The device is also configured to receive, from the enterprise server, a second request to authenticate the first request from the webpage. The device is also configured to trigger, in response to the second request from the enterprise server, the web-browser to execute a predetermined computer program. The device is also configured to scan, by the predetermined computer program, using a short-range wireless communication module of the computing device, a cryptogram from a contactless card. The device is also configured to, in response to determining that the first request is authentic based on the cryptogram, transmit, by the predetermined computer program, a response to the enterprise server causing the enterprise server to send the data. The device is also configured to execute, via the web-browser, the computer-executable instruction from the first request in response to receiving the data sent by the enterprise server. Other embodiments of this aspect include corresponding computer systems, apparatus, and computer programs recorded on one or more computer storage devices, each configured to perform the actions of the methods.

One general aspect includes a non-transitory computer-readable storage medium. The non-transitory computer-readable storage medium includes instructions to receive, via a web-browser executing on the computing device, from a webpage, a first request to execute a computer-executable instruction, the computer-executable instruction requests data from an enterprise server. The medium also includes instructions to receive, from the enterprise server, a second request to authenticate the first request from the webpage. The medium also includes instructions to trigger, in response to the second request from the enterprise server, the web-browser to execute a predetermined computer program. The medium also includes instructions to scan, by the predetermined computer program, using a short-range wireless communication module of the computing device, a cryptogram from a contactless card. The medium also includes instructions to, in response to determining that the first request is authentic based on the cryptogram, transmit, by the predetermined computer program, a response to the enterprise server causing the enterprise server to send the data. The medium also includes instructions to execute, via the web-browser, the computer-executable instruction from the first request in response to receiving the data sent by the enterprise server. Other embodiments of this aspect include corresponding computer systems, apparatus, and computer programs recorded on one or more computer storage devices, each configured to perform the actions of the methods.

Non-transitory computer program products (i.e., physically embodied computer program products) are also described that store instructions, which, when executed by one or more data processors of one or more computing systems, cause at least one data processor to perform operations herein. Similarly, computer systems are also described, which may include one or more data processors and memory coupled to the one or more data processors. The memory may temporarily or permanently store instructions that cause at least one processor to perform one or more of the operations described herein. In addition, methods can be implemented by one or more data processors, which are either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
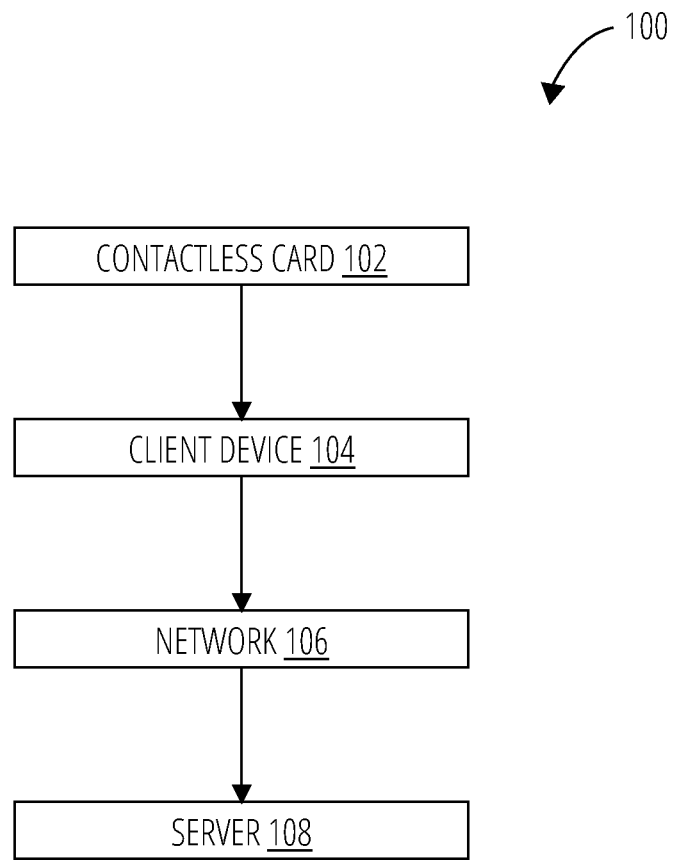
FIG. 1 illustrates an aspect of the subject matter in accordance with one embodiment.

FIG. 1 illustrates a data transmission system 100 according to an example embodiment. As further discussed below, system 100 may include contactless card 102, client device 104, network 106, and server 108. Although FIG. 1 illustrates single instances of the components, system 100 may include any number of components.

System 100 may include one or more contactless cards 102, which are further explained below. In some embodiments, contactless card 102 may be in wireless communication, utilizing NFC in an example, with client device 104.

System 100 may include client device 104, which may be a network-enabled computing device ("computing device" or "computer"). As referred to herein, a network-enabled computer may include but is not limited to a computer device, or communications device including, e.g., a server, a network appliance, a personal computer, a workstation, a phone, a handheld PC, a personal digital assistant, a thin client, a fat client, an Internet browser, or other device. Client device 104 also may be a mobile device; for example, a mobile device may include an iPhone, iPod, iPad from Apple® or any other mobile device running Apple's iOS® operating system, any device running Microsoft's Windows® Mobile operating system, any device running Google's Android® operating system, and/or any other smartphone, tablet, or like wearable mobile device.

The client device 104 can include a processor and a memory, and it is understood that the processing circuitry may contain additional components, including processors, memories, error, and parity/CRC checkers, data encoders, anticollision algorithms, controllers, command decoders, security primitives and tamper proofing hardware, as necessary to perform the functions described herein. The client device 104 may further include a display and input devices. The display may be any type of device for presenting visual information, such as a computer monitor, a flat panel display, and a mobile device screen, including liquid crystal displays, light-emitting diode displays, plasma panels, and cathode ray tube displays. The input devices may include any device for entering information into the user's device that is available and supported by the user's device, such as a touch-screen, keyboard, mouse, cursor-control device, touch-screen, microphone, digital camera, video recorder or camcorder. These devices may be used to enter information and interact with the software and other devices described herein.

In some examples, client device 104 of system 100 may execute one or more applications, such as software applications, that enable, for example, network communications with one or more components of system 100 and transmit and/or receive data.

The client device 104 may be in communication with one or more server(s) 108 via one or more network(s) 106, and may operate as a respective front-end to back-end pair with server 108. The client device 104 may transmit, for example, from a mobile device application executing on client device 104, one or more requests to server 108. The one or more requests may be associated with retrieving data from server 108. The server 108 may receive the one or more requests from client device 104. Based on the one or more requests from client device 104, server 108 may be configured to retrieve the requested data from one or more databases (not shown). Based on receipt of the requested data from the one or more databases, server 108 may be configured to transmit the received data to client device 104, the received data being responsive to one or more requests.

System 100 may include one or more networks 106. In some examples, network 106 may be one or more of a wireless network, a wired network, or any combination of a wireless network and a wired network and may be configured to connect client device 104 to server 108. For example, network 106 may include one or more of a fiber optics network, a passive optical network, a cable network, an Internet network, a satellite network, a wireless local area network (LAN), a Global System for Mobile Communication, a Personal Communication Service, a Personal Area Network, Wireless Application Protocol, Multimedia Messaging Service, Enhanced Messaging Service, Short Message Service, Time Division Multiplexing based systems, Code Division Multiple Access based systems, D-AMPS, Wi-Fi, Fixed Wireless Data, IEEE 1202.11 family of networking, Bluetooth, NFC, Radio Frequency Identification (RFID), Wi-Fi, and/or the like.

In addition, network 106 may include, without limitation, telephone lines, fiber optics, IEEE Ethernet 802.3, a wide area network, a wireless personal area network, a LAN, or a global network such as the Internet. In addition, network 106 may support an Internet network, a wireless communication network, a cellular network, or the like, or any combination thereof. Network 106 may further include one network, or any number of the exemplary types of networks mentioned above, operating as a stand-alone network or in cooperation with each other. Network 106 may utilize one or more protocols of one or more network elements to which they are communicatively coupled. Network 106 may translate to or from other protocols to one or more protocols of network devices. Although network 106 is depicted as a single network, it should be appreciated that according to one or more examples, network 106 may comprise a plurality of interconnected networks, such as, for example, the Internet, a service provider's network, a cable television network, corporate networks, such as credit card association networks, and home networks.

System 100 may include one or more servers 108. In some examples, server 108 may include one or more processors, which are coupled to memory. The server 108 may be configured as a central system, server, or platform to control and call various data at different times to execute a plurality of workflow actions. Server 120 may be configured to connect to the one or more databases. The server 108 may be connected to at least one client device 104.

Figure 2:
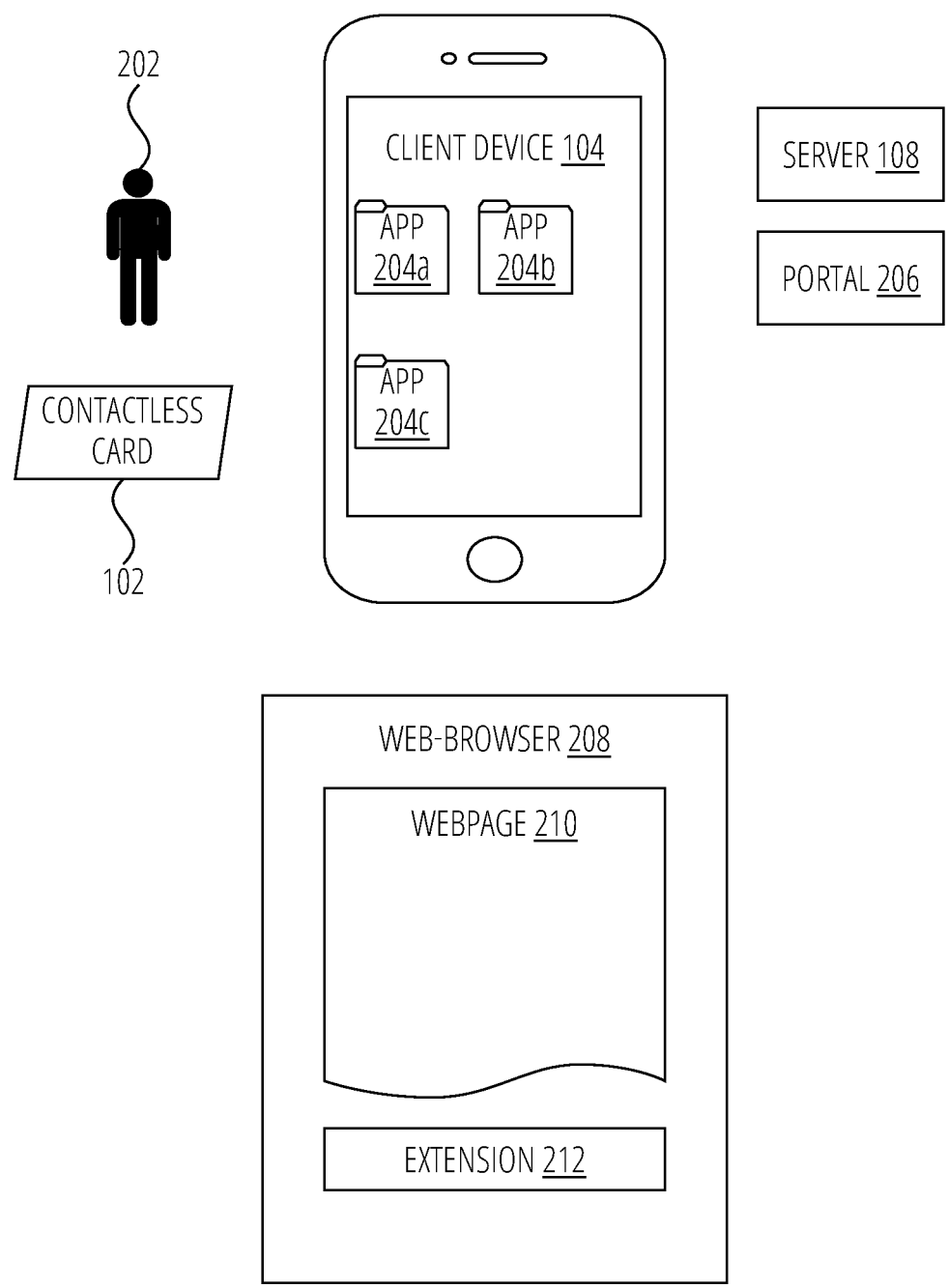
FIG. 2 illustrates an aspect of the subject matter in accordance with one embodiment.

FIG. 2 depicts an example client device 104 in accordance with one embodiment. The client device 104 is depicted as a mobile device, however, it is understood that the client device 104 can be any other computing device in other embodiments. The client device 104 facilitates executing one or more applications ("apps"). Each application includes one or more computer programs, i.e., one or more computer-executable instructions that are executed by the client device 104. For example, in FIG. 2, the client device 104 is depicted with icons for App 204a, App 204b, and App 204c. It is understood that the client device 104 can include additional, fewer, and/or different applications. The applications, such as App 204a, App 204b, and App 204c can include games, banking applications, e-commerce applications, utility applications, entertainment applications, social media applications, web browsers, or any other such applications.

The applications are built for the specific platform of the client device 104, such as iOS® for the Apple® iPhone® or Android® for a Samsung® or any other manufacturer. Generally, the applications are downloaded and installed via an app store and have access to system resources, such as camera, short-range wireless communication module, secure memory, and other hardware and/or software features that the client device 104 provides. In some cases, when an application, such as the App 204a is installed, or used for the first time on the client device 104, a user 202 is requested to authorize/permit the application to use the system resources.

The contactless card 102 may be affiliated with one or more of the applications. For example, consider that the App 204a is affiliated with the contactless card 102. Here, by virtue of being "affiliated," the client device 104 facilitates App 204a to communicate with the contactless card 102, for example, using a short-range wireless communication module, such as NFC. As discussed herein, the affiliation between the contactless card 102 and the App 204a can be established at an earlier time, for example, during activation of the contactless card 102 and/or at the first use of the App 204a. The communication between the contactless card 102 and the App 204a can include the App 204a receiving information, such as security information, user identification, user authorization, etc., from the contactless card 102. In some examples, the App 204a can request for specific information from the contactless card 102. The contactless card 102 provides the particular information and/or responses based on the request from the App 204a. The App 204a can request information from the contactless card 102 in response to a request received by the App 204a from the server 108, in some cases.

In some embodiments, the contactless card 102 is a credit card, sometimes referred to as a "smart card," and the App 204a is an application provided by the bank that issues/services the contactless card 102. The user 202 can use the App 204a on the client device 104 to initiate an operation, such as a purchase or renting of a product, a service, and/or a combination thereof. Alternatively, or in addition, the user 202 can use the App 204a to initiate an operation, such as a money transfer, a withdrawal, a deposit, etc., or a combination thereof. It is understood that several other types of operations are possible and that the examples listed herein are not to be considered limiting. The operation may include the App 204a communicating with the service/product provider's portal 206, which in turn may communicate with the server 108. For example, the service/product provider's portal 206 may communicate with the server 108 to receive confirmation, authorization, or other such information used for completing the operation initiated by the App 204a. The server 108, in response, may request authenticating that the user 202 is an authorized user and in possession of the contactless card 102. Accordingly, the server 108 can instruct the App 204a to confirm the presence of the contactless card 102. In some cases, the App 204a generates and displays a user interface instructing the user 202 to perform a gesture for authenticating the user 202. In some embodiments, the gesture may be performed with the contactless card 102, for example, tap, double-tap, swipe, capturing an image, or any other such gesture. Alternatively, or in addition, the gesture can further include entering an identification code, such as a password, passphrase, a PIN code, etc. Alternatively, or in addition, the gesture includes providing a biometric, such as a fingerprint, an iris scan, a voice sample, etc.

A "tap" may include the user 202 tapping the contactless card 102 on the client device 104. A "swipe" may include the user 202 swiping the contactless card 102 relative to the client device 104. "Capturing an image" may include using the client devices 104 to capture an image of a portion of the contactless card 102. In some examples, the gesture has to be performed relative to a particular portion of the client device 104, such as a top portion, a side portion, etc. It is understood that several other gestures may be used and that a combination of the gestures can also be used in some examples.

The gesture facilitates the App 204a to receive the information from the contactless card 102. The reception of the information based on the gesture facilitates confirming possession of the contactless card 102 by the user 202, and in turn, authentication of the user 202. The App 204a provides the information received from the contactless card 102 to the server 108. In some cases, the App 204a transforms the information before sending the information to the server 108. For example, the App 204a may secure the information, such as by encrypting the information before sending it. Alternatively, or in addition, the App 204a may append additional information, such as an identification of the client device 104 (e.g., an IP address, a MAC address, etc.), a timestamp, or any other such information before furnishing the information to the server 108.

The server 108 authenticates the user 202 upon receiving the information from the client device 104. The server 108, in some cases, further indicates the service/product provider's portal 206 that the user 202 has been authenticated. In response, the service/product provider's portal 206 completes the operation that the App 204a initiated. In this manner, the user 202 can complete the operation using the App 204a and address the technical challenges of authenticating the user 202 and confirming possession of the contactless card 102 by the user 202.

Technical challenges with initiating and completing the operation with certain service/product providers include the App 204a, which is affiliated with the contactless card 102, not being able to access portal 206 (e.g., website, server, etc.) of the service/product provider. For example, the inaccessibility can be due to incompatibility of the underlying computing technology being used by the App 204a and the service/product provider's portal 206. In turn, a practical effect of the technical challenge is that the user 202 is unable to access the product/service provided by the service/product provider.

In some cases, a solution to address the technical challenge of such technological incompatibility is for the service/product provider to provide an application, for example, App 204b. The user 202 initiates the operation via the client device 104 using the App 204b. The App 204b communicates with the App 204a upon receiving the request to complete the operation. The App 204b, in turn, facilitates completing the operation as described herein. The App 204b, in this manner, acts as an interface between the App 204a (affiliated with the contactless card 102) and the service/product provider's portal 206, and addresses the technological incompatibility. A technical challenge with this solution of using App 204b is that the developer of the App 204b has to have access to the App 204a and vice versa, which may not always be the case. Additionally, the interactive nature of the applications, in this case App 204a and App 204b, may require that the two applications be updated (by respective distinct developers) when either one of the applications is updated.

Additionally, the technical challenge with initiating and completing the operation with certain service/product providers persists in the case where the service/product provider does not have an application (App 204b) that can communicate with the App 204a affiliated with the contactless card 102. In such cases, existing solution to access the portal 206 is to use an application, such as a web-browser 208, on the client device 104. However, a technical challenge with using the web-browser 208 to access the portal 206 to initiate and perform the operation is that the client device 104 does not facilitate the web-browser 208, unlike the application (e.g., App 204a) to use all of the resources of the client device 104. Particularly, the web-browser 208 may be prevented from using some of the resources like the short-range wireless communication module of the client device 104. The client device 104 may prevent the web-browser 208 from accessing some of the resources of the client device 104 for several reasons, including security. For example, if the user 202 may inadvertently access malicious code that is embedded in a webpage 210 accessed by the web-browser 208. Suppose such malicious code were to access resources, such as the short-range wireless communication module of the client device 104. In that case, the malicious code may access sensitive and private data of the user 202. The client device 104 may prevent the web-browser 208 from accessing additional or other resources in other embodiments. Hence, without access to some of the resources of the client device 104, the web-browser 208 is unable to facilitate authenticating the user 202 and/or the possession of the contactless card 102 as described herein (using one or more gestures). It should be noted that the web-browser 208 is another application, but a special type of application identified by the client device 104, and accordingly associated with the restricted access of the resources.

The technical solutions described herein address such technical challenges, including the technological incompatibility between the service/product provider's portal 206 and the application (App 204a) affiliated with the contactless card 102; and the inability of the web-browser 208 of accessing all of the resources of the client device 104. The technical solutions herein are accordingly rooted in computing technology, particularly addressing incompatibility-related issues. Further, the technical solutions herein provide improvement(s) to computing technology by facilitating the user 202 to access and complete operations on a service/product provider's portal 206 that is incompatible with the application App 204a affiliated with the contactless card 102. The technical solutions described herein provide a practical application to the user 202, because now s/he can access the portal 206 and proceed with one or more operations that could not be completed via the App 204a (and in absence of App 204b).

Additionally, the technical solutions described herein provide a practical application that the service/product provider does not have to create and distribute an application (e.g., App 204b) for the client device 104. Creating, distributing, and maintaining applications (e.g., App 204a) for every type of client device 104 can become impractical for the service/client provider. Accordingly, the technical solutions described herein also provide a practical application in this regard by reducing the number of applications that the service/product provider has to develop, distribute, and maintain.

Additionally, the technical solutions described herein provide a practical application to the user 202 that s/he does not have to install and maintain applications (e.g., App 204b) for each and every service/product provider s/he may be interacting with. By reducing the number of applications in this manner, the technical solutions facilitate the user 202 to increase the efficiency of the limited memory/storage on the client device 104. Further, each application installed on the client device 104 presents a security risk, and minimizing the number of applications installed on the client device 104 may be desired by the user 202.

To address the technical challenges and to provide the practical applications described herein, the technical solutions described herein facilitate the user 202 to access and complete the one or more operations on the portal 206 via the web-browser 208 of the client device 104. The web-browser 208 can be any type of browser, such as Safari®, Chrome™, Opera™, etc. The web-browser 208 facilitates accessing a webpage 210 provided by the portal 206. The webpage 210 facilitates the user 202 to initiate the operation via the portal 206. It is understood that the portal 206 may provide other ways to begin and to perform the operation instead of the webpage 210, for example, a widget, an applet, a script, or any other such computer programming resource that can be accessed by the web-browser 208.

The technical solutions described herein address such technical challenges by using a predetermined computer program that the web-browser 208 accesses when the user 202 initiates the operation. In some cases, the web-browser 208 accesses the predetermined computer program in response to the user 202 initiating the operation of a particular type that requires the authentication of the user 202 and/or confirming possession of the contactless card 102. Alternatively, or in addition, the web-browser 208 accesses the predetermined computer program in response to the user 202 initiating the operation on specific portals 206, which are included in a list of portals accessible by the web-browser 208. Alternatively, or in addition, the web-browser 208 accesses the predetermined computer program in response to web-browser 208 receiving a request from the portal 206 and/or the server 108 to authenticate the user 202 and/or confirm the possession of the contactless card 102.

In some embodiments, the predetermined computer program is one from a group of computer programs associated with the web-browser 208, the group of computer programs comprising an extension, a plugin, a component, and an addon. The predetermined computer program is depicted as an extension 212, but can be any other type of predetermined computer program that the web-browser 208 can access. Further, while the extension 212 is depicted as being inside the web-browser 208, the extension 212 may be separate from the web-browser 208 in some embodiments. In some embodiments, the extension 212 can be provided by the issuer of the contactless card 102.

The extension 212 can customize the web browsing user-experience on the client device 104. In some embodiments, the extension 212 can use native APIs and frameworks of the operating system (e.g., iOS® and iPadOS®) of the client device 104, as well as web technologies such as HTML, CSS, and JavaScript. The extension 212 can facilitate the web-browser 208 to read and modify the content of the webpage 210. The extension 212 is built with native programming language (e.g., XCode®) of the client device 104 and facilitates communication and sharing of data with native applications. Accordingly, the extension 212 facilitates integrating application content (e.g., from App 204a) into the web-browser 208 or sending web data (from the web-browser 208) back to the application (e.g., App 204a) to create a unified experience. The extension 212, in some embodiments, may facilitate blocking certain content types on the webpage 210 being accessed by the web-browser 208. Blocking behaviors may include hiding elements, blocking loads, and removing cookies from requests received by the web-browser 208.

Figure 3:
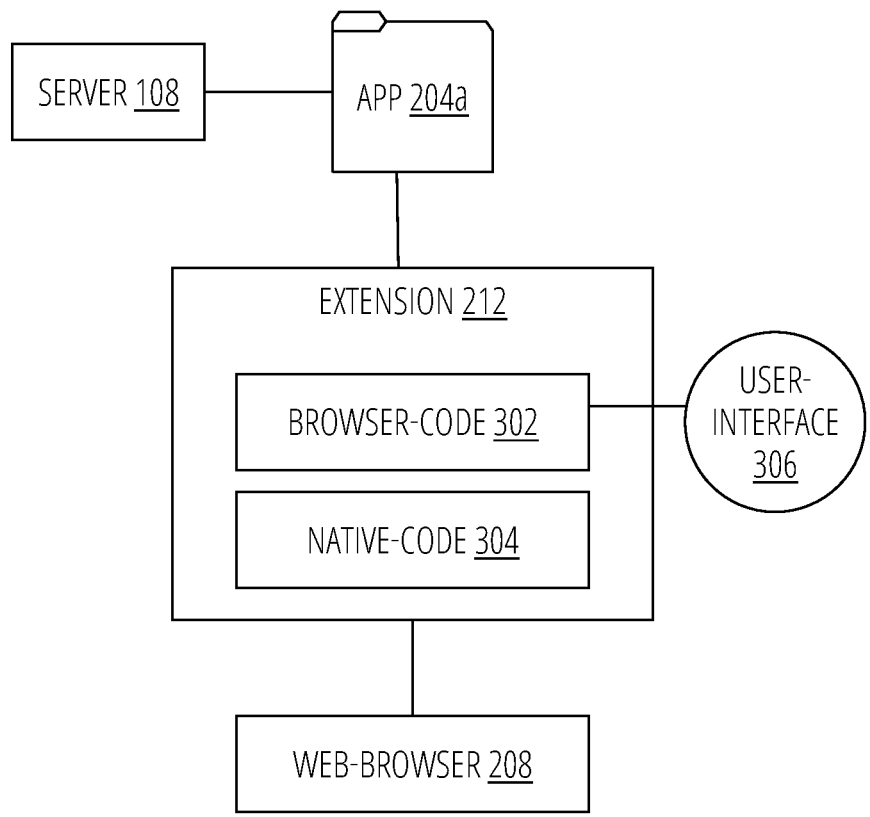
FIG. 3 illustrates an aspect of the subject matter in accordance with one embodiment.

FIG. 3 illustrates an extension 212 in accordance with one or more embodiments. The extension 212 includes at least browser-code 302 and native-code 304. In some embodiments, the browser-code 302 includes computer-executable instructions, for example, JavaScript code and web files, that work in the web-browser 208. The native-code 304 includes computer-executable instructions, for example, using functions/application programming interface (API) of the client device's (104) operating system. The native-code 304 mediates between the application that is affiliated with the contactless card 102, such as the App 204a, and the browser-code 302. In some embodiments, messaging APIs communicate events and event data between the browser-code 302 and the native-code 304.

It should be noted that the App 204a, the web-browser 208, and the extension 212, each execute (i.e., operate) independently in their own sandboxed environments, i.e., separated containers. Because the App 204a and the extension 212 run in respective sandboxed environments, they cannot share data in their respective containers. In some embodiments, data can be stored in a shared space that both the App 204a and the extension 212 can access and update. For example, in the iOS® operating system, such a shared space can be enabled by enabling the "app groups" option. It is understood that in other operating system environments, additional and/or different options may have to be enabled.

The browser-code 302 can facilitate providing a user-interface 306 for the extension 212. In some embodiments, the browser-code 302 sends messages from a background script or from extension pages. The user-interface 306 can include interactive elements that are rendered as part of the web-browser 208 and/or as part of the App 204a. The browser-code 302 can include a specific computer-executable instruction, such as a message call that sends a message directed to the App 204a.

The App 204a includes a message handler function that is assigned to respond to the message call. The message call and the message handler are paired with each other, i.e., use a predetermined protocol to facilitate transferring particular data as specific parameters. For example, JSON or other such protocols may be used for such transfer of data. For example, the messages can be sent from the App 204a to the extension 212 to notify of events, like when the user 202 clicks a button or when data that the extension 212 script uses changes.

Content scripts that are injected into web content of the webpage 210 cannot send messages to the App 204a. However, with messaging, the webpage 210 can control features in the extension 212 based on events or data, or the webpage 210 can request and use data from the extension 212. The extension 212 is configured to receive messages from a list of webpages, including the webpage 210, to facilitate the webpage 210 to request and access the data. For example, to enable messaging from the webpage 210, an identity of the webpage 210 is added to the extension's 212 configuration, such as a JSON manifest file of the extension 212. In response, when the webpage 210 sends a message using the web-browser's 208 messaging instructions (e.g., browser.runtime.sendMessage), the extension 212 is notified to handle the message. In some embodiments, the message from the webpage 210 includes an identifier of the extension 212, message data, and a closure to handle the response from the extension 212. The identifier is a unique identification associated with each extension 212.

In some embodiments, if the extension 212 needs to handle more continuous data from the webpage 210, a port connection is established between the webpage 210 and the extension 212. The extension 212 listens in the background for any such incoming port connection requests from the webpage 210. The created port is then used to communicate data between the extension 212 and the webpage 210 using messages directed to the port. Further, the extension 212 includes computer-executable instructions that add functionality to handle messages that the webpage 210 sends to the extension 212, and respond to that webpage 210.

Accordingly, the extension 212, i.e., the predetermined computer program, facilitates the webpage 210 to communicate with the App 204a that is affiliated with the contactless card 102. Using such communication enabled by the extension 212, the technical solutions described herein facilitate the user 202 to access the portal 206. Further, in response to one or more requests from the webpages 210 of the portal 206, the technical solutions herein facilitate authenticating the user 202 and confirming possession of the contactless card 102 using the one or more gestures described herein. For example, upon receiving a request from the webpage 210, the extension 212 requests the App 204a to perform the authenticating. The extension 212 subsequently provides a result of the authenticating to the webpage 210.

Figure 4:
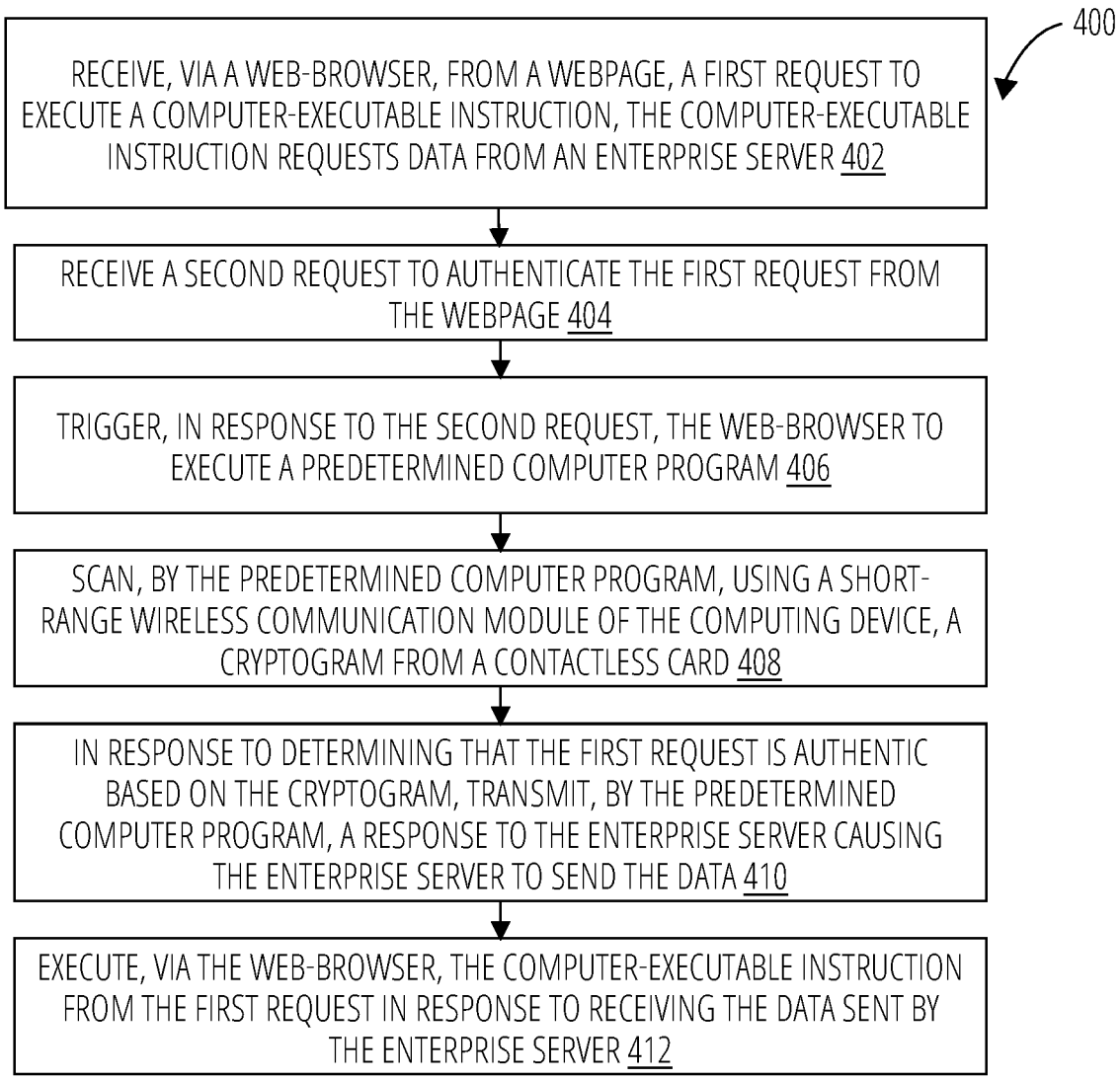
FIG. 4 illustrates method 400 in accordance with one embodiment.

FIG. 4 illustrates a method 400 in accordance with one embodiment. Method 400 can be a computer-implemented method, for example, executed by the client device 104. In block 402, method 400 includes receiving, via the web-browser 208 executing on the client device 104, from the webpage 210, a first request to execute a computer-executable instruction, the computer-executable instruction requests data from the server 108. The computer-executable instruction may be part of a secure transaction being performed via the web-browser 208 on the webpage 210 of the service/product provider's portal 206. For example, the secure transaction can be an online operation, and include at least one of a login transaction, a commercial transaction, and a data transfer transaction. The server 108 can be a bank server, an authentication server, an intermediate server, or any other server 108 that facilitates authenticating the user 202 and/or provides information about the user 202 upon authentication.

For example, the user 202 may initiate the operation with the service/product provider's portal 206 via the webpage 210. In response, the portal 206 may request that the user 202 provide additional information to complete the operation. The additional information can include but is not limited to authentication information, identification information, bank account information, payment authorization information, or the like. The portal 206 may request that a third-party enterprise server, such as the server 108 provide such information. Accordingly, the computer-executable instruction requests data from the server 108 to facilitate such information provision.

In block 404, method 400 includes receiving a second request from the server 108 to authenticate the first request from the webpage. Authenticating the first request includes verification that an authorized user initiated the first request. Determining that the user 202 is an authorized user may require confirmation that the user 202 is in possession of the contactless card 102. Hence, the server 108 sends the second request to the client device 104 to perform the authentication and/or confirmation of the possession.

In block 406, method 400 includes triggering, in response to the second request, by the web-browser 208 execution of a predetermined computer program, i.e., the extension 212. In some embodiments, the second request may be issued by the server 108. For example, the portal 206 may request that a third-party enterprise server, such as the server 108 provide authentication information of the user 202. Accordingly, the web-browser 208 triggers the extension 212 to request data from the server 108 to facilitate such information provision. In other embodiments, the second request may be issued by the portal 206. For example, the portal 206 may determine that the operation initiated by the user 202 is via the web-browser 208. In response, the portal 206 triggers the extension 212 for the web-browser 208 to request the authentication via the server 108. In yet other embodiments, the second request may be issued by the client device 104 itself. For example, the web-browser 208 may identify the operation being performed as one of the predetermined operations, such as a payment operation, a login operation, a banking operation, a document signing operation, etc., which may benefit from additional security. In response, the web-browser 208 proactively triggers the extension 212, which causes the user 202 to be authenticated using the contactless card 102.

As described herein, upon receipt of the second request, the extension 212 causes the the client device 104 to authenticate the user 202 and confirm possession of the contactless card 102. For example, the extension 212 can be configured to use message handling to listen for the second request from the server 108. The second request includes an identification of the extension 212 and a computer-executable instruction to cause the client device 104 to authenticate the user 202. The identification of the server 108 may be stored in the list of servers that are enabled for communication with the extension 212.

In block 408, method 400 includes scanning, by the extension 212, using a short-range wireless communication module of the client device 104, authentication information of the user 202 from the contactless card 102. In some embodiments, the extension 212 uses the App 204a (native application) to facilitate authenticating the user 202 and confirming possession of the contactless card 102. For example, the gesture-based technique(s) described herein can be used for the authentication. In some embodiments, the App 204a can be initiated and executed on the client device 104, and generating and displaying the user-interface 306 that instructs the user 202 to perform one or more gestures with the contactless card 102 in relation to the client device 104. Alternatively, the App 204a is executed in the background, and the user-interface 306 is generated and displayed as part of the web-browser 208, with the instruction to perform the contactless card 102 related gesture.

As part of the gesture-based authentication, the client device 104 receives from the contactless card 102, an identification information that is stored on the contactless card 102. In some embodiments, the identification information can be provided in the form of a cryptogram. The identification information or any other information received from the contactless card 102 can be in any other secure form in other embodiments.

In block 410, method 400 includes, in response to determining that the first request is authentic based on the authentication information received, transmitting, by the extension 212, a response to the server 108 causing the server 108 to send the data requested by the portal 206. In some embodiments, determining that the first request is authentic based on the cryptogram includes validating the cryptogram by the extension 212. The validation may be performed by the extension 212 based on a comparison with stored information. In some embodiments, the extension 212 transmits a response of the authentication to the server 108 causing the server 108 to send the data for the computer-executable instruction from the first request. The server 108 may send the data only if the authentication passes. If the authentication fails, the server 108 may send another data that causes a user-notification, and aborting the operation.

In some embodiments, determining that the first request is authentic based on the cryptogram includes transmitting the cryptogram by the extension 212, for receipt by the server 108. The server 108 validates the information in the cryptogram, for example, by comparing the information with stored information. In response to validating the cryptogram by the server 108, the server 108 sends the data for the computer-executable instruction.

In some embodiments, upon authenticating (by the client device 104 or by the server 108), the server 108 may send the data directly to the portal 206. Alternatively, or in addition, the server 108 sends the data to the client device 104, which, in turn, sends the data to the portal 206 via the web-browser 208.

In block 412, method 400 includes executing, via the web-browser 208, the computer-executable instruction from the first request in response to receiving the data sent by the server 108. Accordingly, the client device 104 executes the computer-executable instruction from the first request only upon authenticating the user 202. In this manner, the method 400 facilitates the web-browser 208 to be used by the user 202 to perform an operation that requires that the user 202 be authenticated using a contactless card 102 related gesture that uses one or more resources of the client device 104. In some embodiments, executing the computer-executable instruction may include completing the operation by providing payment information, login information, banking information, or any other such information that facilitates completing the operation.

Consider an example scenario where a customer (user 202) is purchasing an item from an online portal (206) using a credit card (contactless card 102) via a web-browser (208), mobile phone, or any other computing device (client device 104). The user 202 initiates the checkout process (online operation) via the portal. The portal may require that the user provides additional authentication information and sends a request to the web-browser. In some examples, the request from the portal may request to trigger the extension (212) of the web-browser. Alternatively, the web-browser, in response to the request from the portal, the web-browser determines the extension that has to be triggered. In yet other embodiments, the web-browser, in response to the first request from the portal, issues a request to an enterprise server (server 108) affiliated with the credit card to provide the authentication information. The enterprise server responds with a second request, in response to which the web-browser triggers the extension. Upon being triggered, the extension facilitates an application (App 204a) affiliated with the credit card to perform a gesture-based authentication. The result of the authentication is provided to the enterprise server and/or the portal. Based on the authentication result, the operation is either completed (checkout processed) or aborted (checkout denied).

It should be understood that the above is just one example scenario of a practical application of the technical solutions described herein and that not a limiting example. The technical solutions described herein can be used in other example scenarios, such as facilitating the user 202 to login to a system with additional authentication. Alternatively, the technical solutions described herein can facilitate the user to transfer digital information using additional security measures using the gesture-based authentication. Several other practical applications of the technical solutions described herein are possible.

Figure 5:
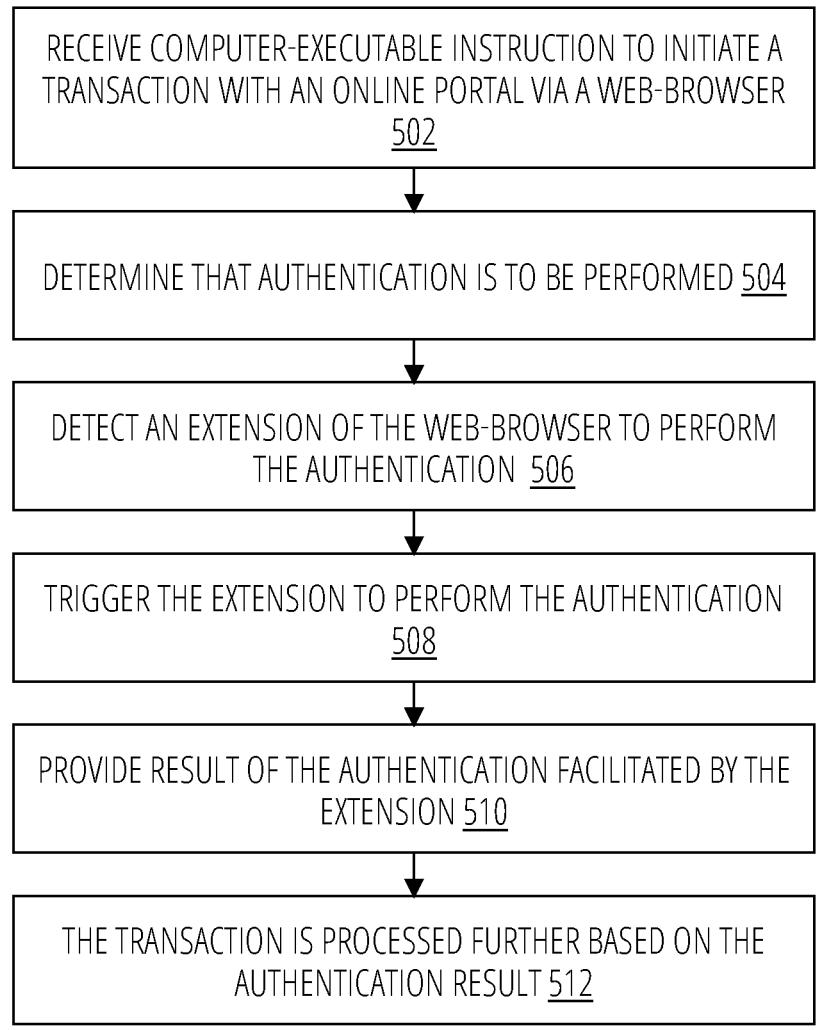
FIG. 5 illustrates an aspect of the subject matter in accordance with one embodiment.

FIG. 5 illustrates an example routine for initiating and completing an operation or transaction using a web-browser of a client device, where the operation requires a user-authentication based on a physical transaction card. Although the example routine depicts a particular sequence of operations, the sequence may be altered without departing from the scope of the present disclosure. For example, some of the operations depicted may be performed in parallel or in a different sequence that does not materially affect the function of the routine. In other examples, different components of an example device or system that implements the routine may perform functions at substantially the same time or in a specific sequence.

According to some examples, the method includes receiving computer-executable instructions to initiate a transaction with an online portal 206 via a web-browser 208 at block 502. For example, the transaction can include a login transaction, an online purchase, a banking transaction (e.g., money transfer, payment, etc.), a data transfer transaction (e.g., content upload, content download, etc.), etc. It should be noted that the transaction is being performed via the web-browser 208 (e.g., Safari, Chrome, Firefox, etc.) and not an application or other type of computer program. The transaction can be initiated by the user 202 in some embodiments.

According to some examples, the method includes determining that authentication is to be performed at block 504. The determination may be made by the portal 206 in some embodiments. In other embodiments, the determination may be made by a server 108 (distinct from the portal 206), where the server 108 performs one or more operations that are part of the transaction. For example, the portal 206 may request an authentication via the server 108, which, in turn, performs the authentication via the client device 104. In yet other embodiments, the web-browser 208 determines that the authentication is required. The authentication can include authenticating the user 202 based on a transaction card, such as the contactless card 102. The authentication can further include ensuring that the user 202 is in physical possession of the contactless card 102.

According to some examples, the method includes detecting an extension 212 of the web-browser 208 to perform the authentication at block 506. The extension 212 may be a predetermined computer program that the web-browser 208 can access and cause to execute. The extension 212 can be one of several extensions of the web-browser 208. The portal 206, the server 108 may request the web-browser 208 to determine if the extension 212 is installed on the client device 104 being used for the transaction. Alternatively, the web-browser 208 may detect if the extension 212 exists independently, without an incoming request. In some embodiments, if the extension 212 does not exist, the transaction may not be completed via the web-browser 208. A notification may be generated and displayed via the user-interface 306 indicating that the transaction was not completed and, in some embodiments, suggesting alternatives to the user 202.

According to some examples, in the case where the extension 212 is available and detected, the method includes triggering the extension 212 to perform the authentication at block 508. Upon being triggered, the extension 212 facilitates performing the authentication. For example, the extension 212 uses an application (App 204a) affiliated with the contactless card 102 to perform a gesture-based authentication.

According to some examples, the method includes providing the result of the authentication facilitated by the extension 212 at block 510. According to some examples, the method includes proceeding with the initiated transaction further based on the authentication result at block 512.

In this manner, technical solutions described herein facilitate initiating and completing an operation or transaction using a web-browser 208 of a client device 104, where the operation requires a user-authentication based on a physical presence of a contactless card 102 in a predetermined vicinity of the client device 104.

Figure 6:
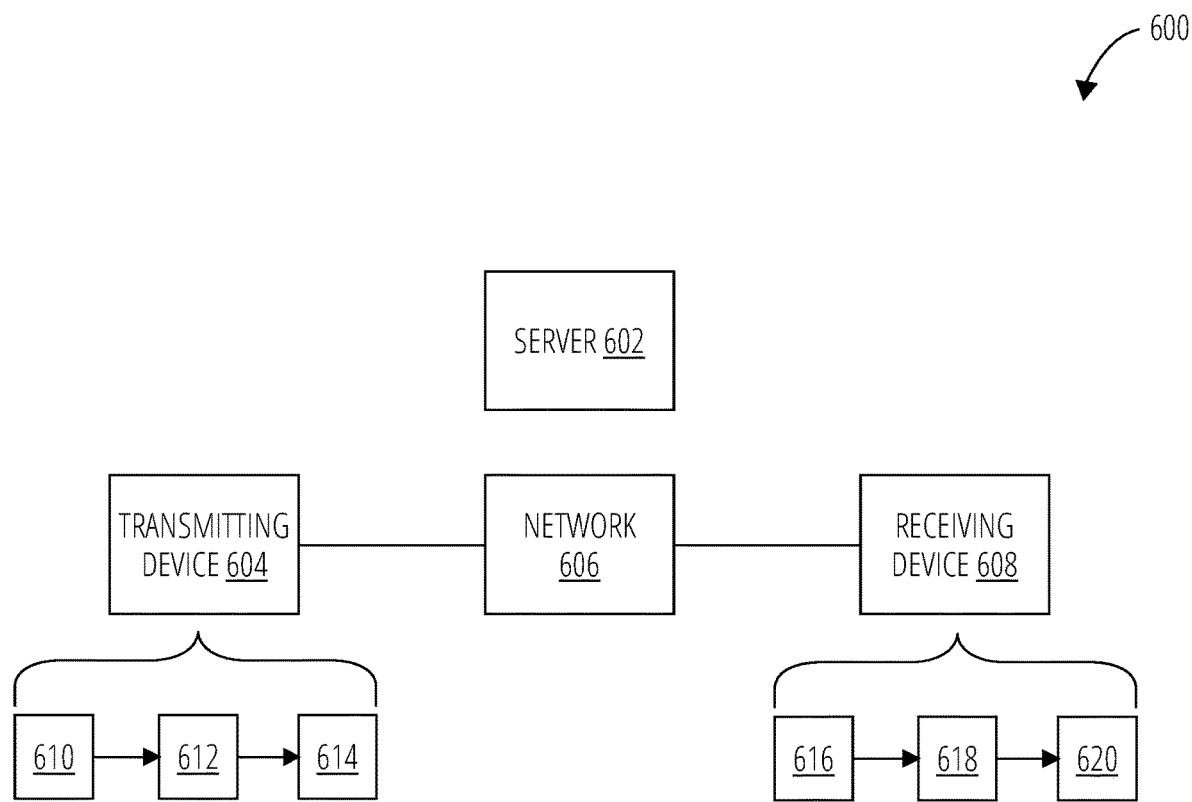
FIG. 6 illustrates an aspect of the subject matter in accordance with one embodiment.

FIG. 6 illustrates a data transmission system according to an example embodiment. System 600 may include a transmitting or transmitting device 604, a receiving or receiving device 608 in communication, for example, via network 606, with one or more servers 602. Transmitting or transmitting device 604 may be the same as, or similar to, client device 104 discussed above with reference to FIG. 1. Receiving or receiving device 608 may be the same as, or similar to, client device 104 discussed above with reference to FIG. 1. Network 606 may be similar to network 106 discussed above with reference to FIG. 1. Server 602 may be similar to server 108 discussed above with reference to FIG. 1. Although FIG. 6 shows single instances of components of system 600, system 600 may include any number of the illustrated components.

When using symmetric cryptographic algorithms, such as encryption algorithms, hash-based message authentication code (HMAC) algorithms, and cipher-based message authentication code (CMAC) algorithms, it is important that the key remain secret between the party that originally processes the data that is protected using a symmetric algorithm and the key, and the party who receives and processes the data using the same cryptographic algorithm and the same key.

It is also important that the same key is not used too many times. If a key is used or reused too frequently, that key may be compromised. Each time the key is used, it provides an attacker an additional sample of data which was processed by the cryptographic algorithm using the same key. The more data which the attacker has which was processed with the same key, the greater the likelihood that the attacker may discover the value of the key. A key used frequently may be comprised in a variety of different attacks.

Moreover, each time a symmetric cryptographic algorithm is executed, it may reveal information, such as side-channel data, about the key used during the symmetric cryptographic operation. Side-channel data may include minute power fluctuations which occur as the cryptographic algorithm executes while using the key. Sufficient measurements may be taken of the side-channel data to reveal enough information about the key to allow it to be recovered by the attacker. Using the same key for exchanging data would repeatedly reveal data processed by the same key.

However, by limiting the number of times a particular key will be used, the amount of side-channel data which the attacker is able to gather is limited and thereby reduce exposure to this and other types of attack. As further described herein, the parties involved in the exchange of cryptographic information (e.g., sender and recipient) can independently generate keys from an initial shared master symmetric key in combination with a counter value, and thereby periodically replace the shared symmetric key being used with needing to resort to any form of key exchange to keep the parties in sync. By periodically changing the shared secret symmetric key used by the sender and the recipient, the attacks described above are rendered impossible.

Referring to FIG. 6, system 600 may be configured to implement key diversification. For example, a sender and recipient may desire to exchange data (e.g., original sensitive data) via respective devices 604 and 608. As explained above, although single instances of transmitting device 604 and receiving device 608 may be included, it is understood that one or more transmitting devices 604 and one or more receiving devices 608 may be involved so long as each party shares the same shared secret symmetric key. In some examples, the transmitting device 604 and receiving device 608 may be provisioned with the same master symmetric key. Further, it is understood that any party or device holding the same secret symmetric key may perform the functions of the transmitting device 604 and similarly any party holding the same secret symmetric key may perform the functions of the receiving device 608. In some examples, the symmetric key may comprise the shared secret symmetric key which is kept secret from all parties other than the transmitting device 604 and the receiving device 608 involved in exchanging the secure data. It is further understood that both the transmitting device 604 and receiving device 608 may be provided with the same master symmetric key, and further that part of the data exchanged between the transmitting device 604 and receiving device 608 comprises at least a portion of data which may be referred to as the counter value. The counter value may comprise a number that changes each time data is exchanged between the transmitting device 604 and the receiving device 608.

System 600 may include one or more networks 606. In some examples, network 606 may be one or more of a wireless network, a wired network or any combination of wireless network and wired network, and may be configured to connect one or more transmitting devices 604 and one or more receiving devices 608 to server 602. For example, network 606 may include one or more of a fiber optics network, a passive optical network, a cable network, an Internet network, a satellite network, a wireless LAN, a Global System for Mobile Communication, a Personal Communication Service, a Personal Area Network, Wireless Application Protocol, Multimedia Messaging Service, Enhanced Messaging Service, Short Message Service, Time Division Multiplexing based systems, Code Division Multiple Access based systems, D-AMPS, Wi-Fi, Fixed Wireless Data, IEEE 1202.11 family network, Bluetooth, NFC, RFID, Wi-Fi, and/or the like.

In addition, network 606 may include, without limitation, telephone lines, fiber optics, IEEE Ethernet 1302.3, a wide area network, a wireless personal area network, a LAN, or a global network such as the Internet. In addition, network 606 may support an Internet network, a wireless communication network, a cellular network, or the like, or any combination thereof. Network 606 may further include one network, or any number of the exemplary types of networks mentioned above, operating as a stand-alone network or in cooperation with each other. Network 606 may utilize one or more protocols of one or more network elements to which they are communicatively coupled. Network 606 may translate to or from other protocols to one or more protocols of network devices. Although network 606 is depicted as a single network, it should be appreciated that according to one or more examples, network 606 may comprise a plurality of interconnected networks, such as, for example, the Internet, a service provider's network, a cable television network, corporate networks, such as credit card association networks, and home networks.

In some examples, one or more transmitting devices 604 and one or more receiving devices 608 may be configured to communicate and transmit and receive data between each other without passing through network 606. For example, communication between the one or more transmitting devices 604 and the one or more receiving devices 608 may occur via at least one of NFC, Bluetooth, RFID, Wi-Fi, and/or the like.

At block 610, when the transmitting device 604 is preparing to process the sensitive data with symmetric cryptographic operation, the sender may update a counter. In addition, the transmitting device 604 may select an appropriate symmetric cryptographic algorithm, which may include at least one of a symmetric encryption algorithm, HMAC algorithm, and a CMAC algorithm. In some examples, the symmetric algorithm used to process the diversification value may comprise any symmetric cryptographic algorithm used as needed to generate the desired length diversified symmetric key. Non-limiting examples of the symmetric algorithm may include a symmetric encryption algorithm such as 3DES or AES128; a symmetric HMAC algorithm, such as HMAC-SHA-256; and a symmetric CMAC algorithm such as AES-CMAC. It is understood that if the output of the selected symmetric algorithm does not generate a sufficiently long key, techniques such as processing multiple iterations of the symmetric algorithm with different input data and the same master key may produce multiple outputs which may be combined as needed to produce sufficient length keys.

At block 612, the transmitting device 604 may take the selected cryptographic algorithm, and using the master symmetric key, process the counter value. For example, the sender may select a symmetric encryption algorithm, and use a counter which updates with every conversation between the transmitting device 604 and the receiving device 608. The transmitting device 604 may then encrypt the counter value with the selected symmetric encryption algorithm using the master symmetric key, creating a diversified symmetric key.

In some examples, the counter value may not be encrypted. In these examples, the counter value may be transmitted between the transmitting device 604 and the receiving device 608 at block 612 without encryption.

At block 614, the diversified symmetric key may be used to process the sensitive data before transmitting the result to the receiving device 608. For example, the transmitting device 604 may encrypt the sensitive data using a symmetric encryption algorithm using the diversified symmetric key, with the output comprising the protected encrypted data. The transmitting device 604 may then transmit the protected encrypted data, along with the counter value, to the receiving device 608 for processing.

At block 616, the receiving device 608 may first take the counter value and then perform the same symmetric encryption using the counter value as input to the encryption, and the master symmetric key as the key for the encryption. The output of the encryption may be the same diversified symmetric key value that was created by the sender.

At block 618, the receiving device 608 may then take the protected encrypted data and using a symmetric decryption algorithm along with the diversified symmetric key, decrypt the protected encrypted data.

At block 620, as a result of the decrypting the protected encrypted data, the original sensitive data may be revealed.

The next time sensitive data needs to be sent from the sender to the recipient via respective transmitting device 604 and receiving device 608, a different counter value may be selected producing a different diversified symmetric key. By processing the counter value with the master symmetric key and same symmetric cryptographic algorithm, both the transmitting device 604 and receiving device 608 may independently produce the same diversified symmetric key. This diversified symmetric key, not the master symmetric key, is used to protect the sensitive data.

As explained above, both the transmitting device 604 and receiving device 608 each initially possess the shared master symmetric key. The shared master symmetric key is not used to encrypt the original sensitive data. Because the diversified symmetric key is independently created by both the transmitting device 604 and receiving device 608, it is never transmitted between the two parties. Thus, an attacker cannot intercept the diversified symmetric key and the attacker never sees any data which was processed with the master symmetric key. Only the counter value is processed with the master symmetric key, not the sensitive data. As a result, reduced side-channel data about the master symmetric key is revealed. Moreover, the operation of the transmitting device 604 and the receiving device 608 may be governed by symmetric requirements for how often to create a new diversification value, and therefore a new diversified symmetric key. In an embodiment, a new diversification value and therefore a new diversified symmetric key may be created for every exchange between the transmitting device 604 and receiving device 608.

In some examples, the key diversification value may comprise the counter value. Other non-limiting examples of the key diversification value include: a random nonce generated each time a new diversified key is needed, the random nonce sent from the transmitting device 604 to the receiving device 608; the full value of a counter value sent from the transmitting device 604 and the receiving device 608; a portion of a counter value sent from the transmitting device 604 and the receiving device 608; a counter independently maintained by the transmitting device 604 and the receiving device 608 but not sent between the two devices; a one-time-passcode exchanged between the transmitting device 604 and the receiving device 608; and a cryptographic hash of the sensitive data. In some examples, one or more portions of the key diversification value may be used by the parties to create multiple diversified keys. For example, a counter may be used as the key diversification value. Further, a combination of one or more of the exemplary key diversification values described above may be used.

In another example, a portion of the counter may be used as the key diversification value. If multiple master key values are shared between the parties, the multiple diversified key values may be obtained by the systems and processes described herein. A new diversification value, and therefore a new diversified symmetric key, may be created as often as needed. In the most secure case, a new diversification value may be created for each exchange of sensitive data between the transmitting device 604 and the receiving device 608. In effect, this may create a one-time use key, such as a single-use session key.

Figure 7:
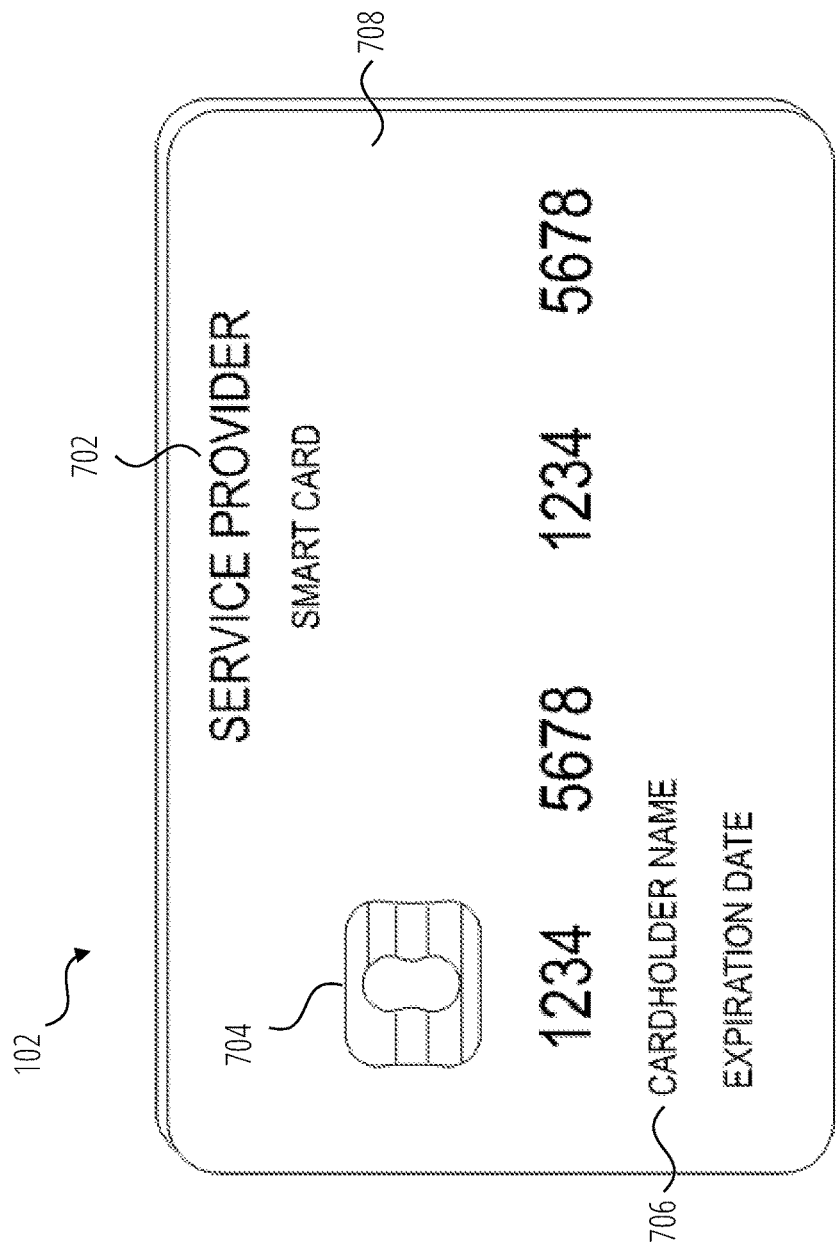
FIG. 7 illustrates a contactless card 102 in accordance with one embodiment.

FIG. 7 illustrates an example configuration of a contactless card 102, which may include a payment card, such as a credit card, debit card, or gift card, issued by a service provider as displayed as service provider indicia 702 on the front or back of the contactless card 102. In some examples, the contactless card 102 is not related to a payment card, and may include, without limitation, an identification card. In some examples, the transaction card may include a dual interface contactless payment card, a rewards card, and so forth. The contactless card 102 may include a substrate 708, which may include a single layer, or one or more laminated layers composed of plastics, metals, and other materials. Exemplary substrate materials include polyvinyl chloride, polyvinyl chloride acetate, acrylonitrile butadiene styrene, polycarbonate, polyesters, anodized titanium, palladium, gold, carbon, paper, and biodegradable materials. In some examples, the contactless card 102 may have physical characteristics compliant with the ID-1 format of the ISO/IEC 7816 standard, and the transaction card may otherwise be compliant with the ISO/IEC 14443 standard. However, it is understood that the contactless card 102 according to the present disclosure may have different characteristics, and the present disclosure does not require a transaction card to be implemented in a payment card.

Figure 8:
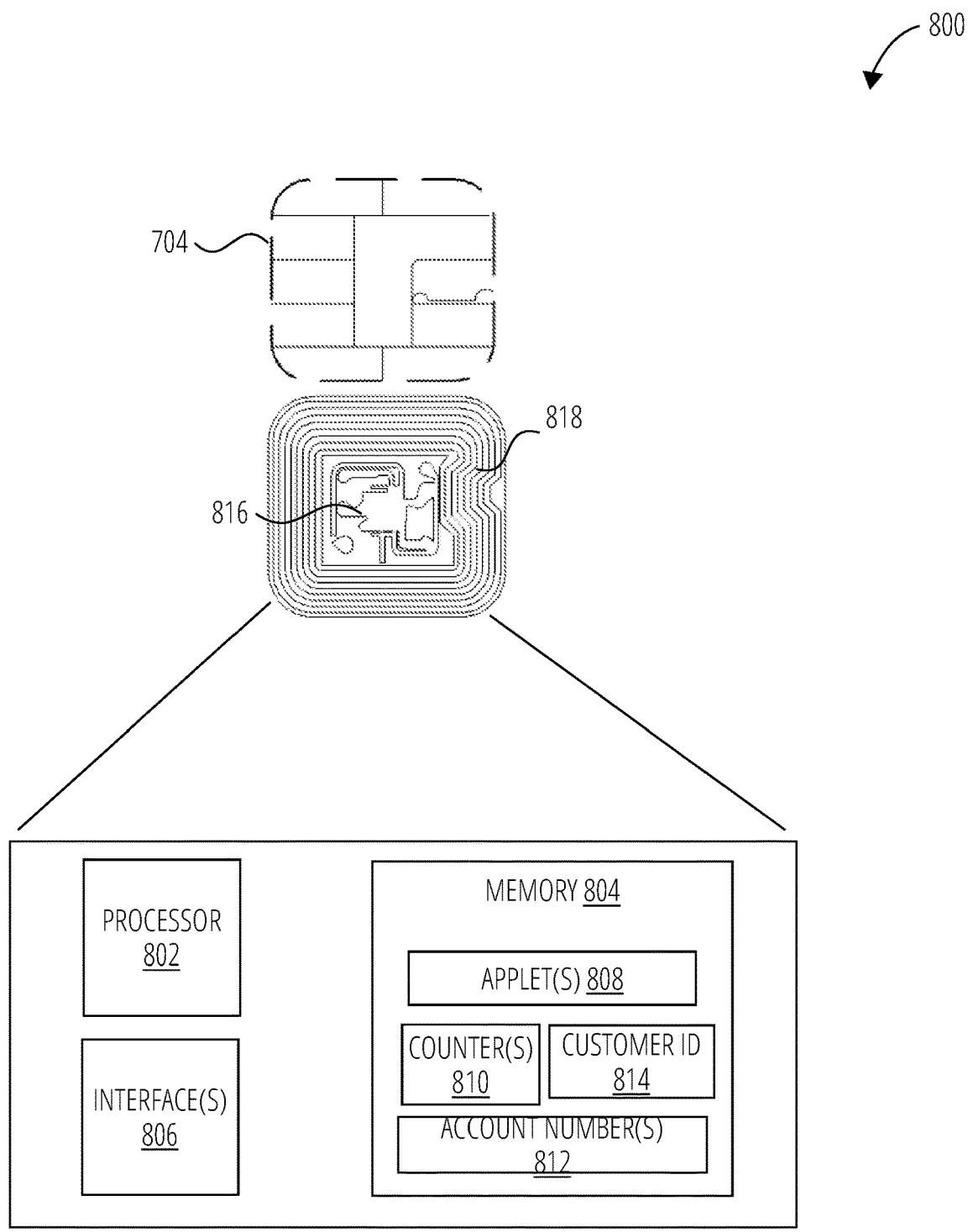
FIG. 8 illustrates a transaction card component 800 in accordance with one embodiment.

The contactless card 102 may also include identification information 706 displayed on the front and/or back of the card, and a contact pad 704. The contact pad 704 may include one or more pads and be configured to establish contact with another client device, such as an ATM, a user device, smartphone, laptop, desktop, or tablet computer via transaction cards. The contact pad may be designed in accordance with one or more standards, such as ISO/IEC 7816 standard, and enable communication in accordance with the EMV protocol. The contactless card 102 may also include processing circuitry, antenna and other components as will be further discussed in FIG. 8. These components may be located behind the contact pad 704 or elsewhere on the substrate 708, e.g., within a different layer of the substrate 708, and may electrically and physically coupled with the contact pad 704. The contactless card 102 may also include a magnetic strip or tape, which may be located on the back of the card (not shown in FIG. 7). The contactless card 102 may also include a Near-Field Communication (NFC)

device coupled with an antenna capable of communicating via the NFC protocol. Embodiments are not limited in this manner.

As illustrated, the contact pad 704 of contactless card 102 may include processing circuitry 816 for storing, processing, and communicating information, including a processor 802, a memory 804, and one or more interface(s) 806. It is understood that the processing circuitry 816 may contain additional components, including processors, memories, error and parity/CRC checkers, data encoders, anticollision algorithms, controllers, command decoders, security primitives and tamper proofing hardware, as necessary to perform the functions described herein.

The memory 804 may be a read-only memory, write-once read-multiple memory or read/write memory, e.g., RAM, ROM, and EEPROM, and the contactless card 102 may include one or more of these memories. A read-only memory may be factory programmable as read-only or one-time programmable. One-time programmability provides the opportunity to write once then read many times. A write once/read-multiple memory may be programmed at a point in time after the memory chip has left the factory. Once the memory is programmed, it may not be rewritten, but it may be read many times. A read/write memory may be programmed and re-programed many times after leaving the factory. A read/write memory may also be read many times after leaving the factory. In some instances, the memory 804 may be encrypted memory utilizing an encryption algorithm executed by the processor 802 to encrypted data.

The memory 804 may be configured to store one or more applet(s) 808, one or more counter(s) 810, a customer identifier 814, and the account number(s) 812, which may be virtual account numbers. The one or more applet(s) 808 may comprise one or more software applications configured to execute on one or more contactless cards, such as a Java® Card applet. However, it is understood that applet(s) 808 are not limited to Java Card applets, and instead may be any software application operable on contactless cards or other devices having limited memory. The one or more counter(s) 810 may comprise a numeric counter sufficient to store an integer. The customer identifier 814 may comprise a unique alphanumeric identifier assigned to a user of the contactless card 102, and the identifier may distinguish the user of the contactless card from other contactless card users. In some examples, the customer identifier 814 may identify both a customer and an account assigned to that customer and may further identify the contactless card 102 associated with the customer's account. As stated, the account number(s) 812 may include thousands of one-time use virtual account numbers associated with the contactless card 102. An applet(s) 808 of the contactless card 102 may be configured to manage the account number(s) 812 (e.g., to select an account number(s) 812, mark the selected account number(s) 812 as used, and transmit the account number(s) 812 to a mobile device for autofilling by an autofilling service.

The processor 802 and memory elements of the foregoing exemplary embodiments are described with reference to the contact pad 704, but the present disclosure is not limited thereto. It is understood that these elements may be implemented outside of the contact pad 704 or entirely separate from it, or as further elements in addition to processor 802 and memory 804 elements located within the contact pad 704.

In some examples, the contactless card 102 may comprise one or more antenna(s) 818. The one or more antenna(s) 818 may be placed within the contactless card 102 and around the processing circuitry 816 of the contact pad 704. For example, the one or more antenna(s) 818 may be integral with the processing circuitry 816 and the one or more antenna(s) 818 may be used with an external booster coil. As another example, the one or more antenna(s) 818 may be external to the contact pad 704 and the processing circuitry 816.

In an embodiment, the coil of contactless card 102 may act as the secondary of an air core transformer. The terminal may communicate with the contactless card 102 by cutting power or amplitude modulation. The contactless card 101 may infer the data transmitted from the terminal using the gaps in the contactless card's power connection, which may be functionally maintained through one or more capacitors. The contactless card 102 may communicate back by switching a load on the contactless card's coil or load modulation. Load modulation may be detected in the terminal's coil through interference. More generally, using the antenna(s) 818, processor 802, and/or the memory 804, the contactless card 101 provides a communications interface to communicate via NFC, Bluetooth, and/or Wi-Fi communications.

As explained above, contactless card 102 may be built on a software platform operable on smart cards or other devices having limited memory, such as JavaCard, and one or more or more applications or applets may be securely executed. Applet(s) 808 may be added to contactless cards to provide a one-time password (OTP) for multifactor authentication (MFA) in various mobile application-based use cases. Applet(s) 808 may be configured to respond to one or more requests, such as near field data exchange requests, from a reader, such as a mobile NFC reader (e.g., of a mobile device or point-of-sale terminal), and produce an NDEF message that comprises a cryptographically secure OTP encoded as an NDEF text tag.

One example of an NDEF OTP is an NDEF short-record layout (SR=1). In such an example, one or more applet(s) 808 may be configured to encode the OTP as an NDEF type 4 well known type text tag. In some examples, NDEF messages may comprise one or more records. The applet(s) 808 may be configured to add one or more static tag records in addition to the OTP record.

In some examples, the one or more applet(s) 808 may be configured to emulate an RFID tag. The RFID tag may include one or more polymorphic tags. In some examples, each time the tag is read, different cryptographic data is presented that may indicate the authenticity of the contactless card. Based on the one or more applet(s) 808, an NFC read of the tag may be processed, the data may be transmitted to a server, such as a server of a banking system, and the data may be validated at the server.

In some examples, the contactless card 102 and server may include certain data such that the card may be properly identified. The contactless card 102 may include one or more unique identifiers (not pictured). Each time a read operation takes place, the counter(s) 810 may be configured to increment. In some examples, each time data from the contactless card 102 is read (e.g., by a mobile device), the counter(s) 810 is transmitted to the server for validation and determines whether the counter(s) 810 are equal (as part of the validation) to a counter of the server.

The one or more counter(s) 810 may be configured to prevent a replay attack. For example, if a cryptogram has been obtained and replayed, that cryptogram is immediately rejected if the counter(s) 810 has been read or used or otherwise passed over. If the counter(s) 810 has not been used, it may be replayed. In some examples, the counter that is incremented on the card is different from the counter that is incremented for transactions. The contactless card 101 is unable to determine the application transaction counter(s) 810 since there is no communication between applet(s) 808 on the contactless card 102.

In some examples, the counter(s) 810 may get out of sync. In some examples, to account for accidental reads that initiate transactions, such as reading at an angle, the counter (s) 810 may increment but the application does not process the counter(s) 810. In some examples, when the mobile device 10 is woken up, NFC may be enabled and the client device 104 may be configured to read available tags, but no action is taken responsive to the reads.

To keep the counter(s) 810 in sync, an application, such as a background application, may be executed that would be configured to detect when the client device 104 wakes up and synchronize with the server 108 of a banking system indicating that a read that occurred due to detection to then move the counter 710 forward. In other examples, Hashed One Time Password may be utilized such that a window of mis-synchronization may be accepted. For example, if within a threshold of 10, the counter(s) 810 may be configured to move forward. But if within a different threshold number, for example within 10 or 1000, a request for performing re-synchronization may be processed which requests via one or more applications that the user tap, gesture, or otherwise indicate one or more times via the user's device. If the counter(s) 810 increases in the appropriate sequence, then it possible to know that the user has done so.

The key diversification technique described herein with reference to the counter(s) 810, master key, and diversified key, is one example of encryption and/or decryption a key diversification technique. This example key diversification technique should not be considered limiting of the disclosure, as the disclosure is equally applicable to other types of key diversification techniques.

During the creation process of the contactless card 102, two cryptographic keys may be assigned uniquely per card. The cryptographic keys may comprise symmetric keys which may be used in both encryption and decryption of data. Triple DES (3DES) algorithm may be used by EMV and it is implemented by hardware in the contactless card 102. By using the key diversification process, one or more keys may be derived from a master key based upon uniquely identifiable information for each entity that requires a key.

In some examples, to overcome deficiencies of 3DES algorithms, which may be susceptible to vulnerabilities, a session key may be derived (such as a unique key per session) but rather than using the master key, the unique card-derived keys and the counter may be used as diversification data. For example, each time the contactless card 102 is used in operation, a different key may be used for creating the message authentication code (MAC) and for performing the encryption. This results in a triple layer of cryptography. The session keys may be generated by the one or more applets and derived by using the application transaction counter with one or more algorithms (as defined in EMV 4.3 Book 2 A1.3.1 Common Session Key Derivation).

Further, the increment for each card may be unique, and assigned either by personalization, or algorithmically assigned by some identifying information. For example, odd numbered cards may increment by 2 and even numbered cards may increment by 5. In some examples, the increment may also vary in sequential reads, such that one card may increment in sequence by 1, 3, 5, 2, 2, . . . repeating. The specific sequence or algorithmic sequence may be defined at personalization time, or from one or more processes derived from unique identifiers. This can make it harder for a replay attacker to generalize from a small number of card instances.

The authentication message may be delivered as the content of a text NDEF record in hexadecimal ASCII format. In another example, the NDEF record may be encoded in hexadecimal format.

Figure 9:
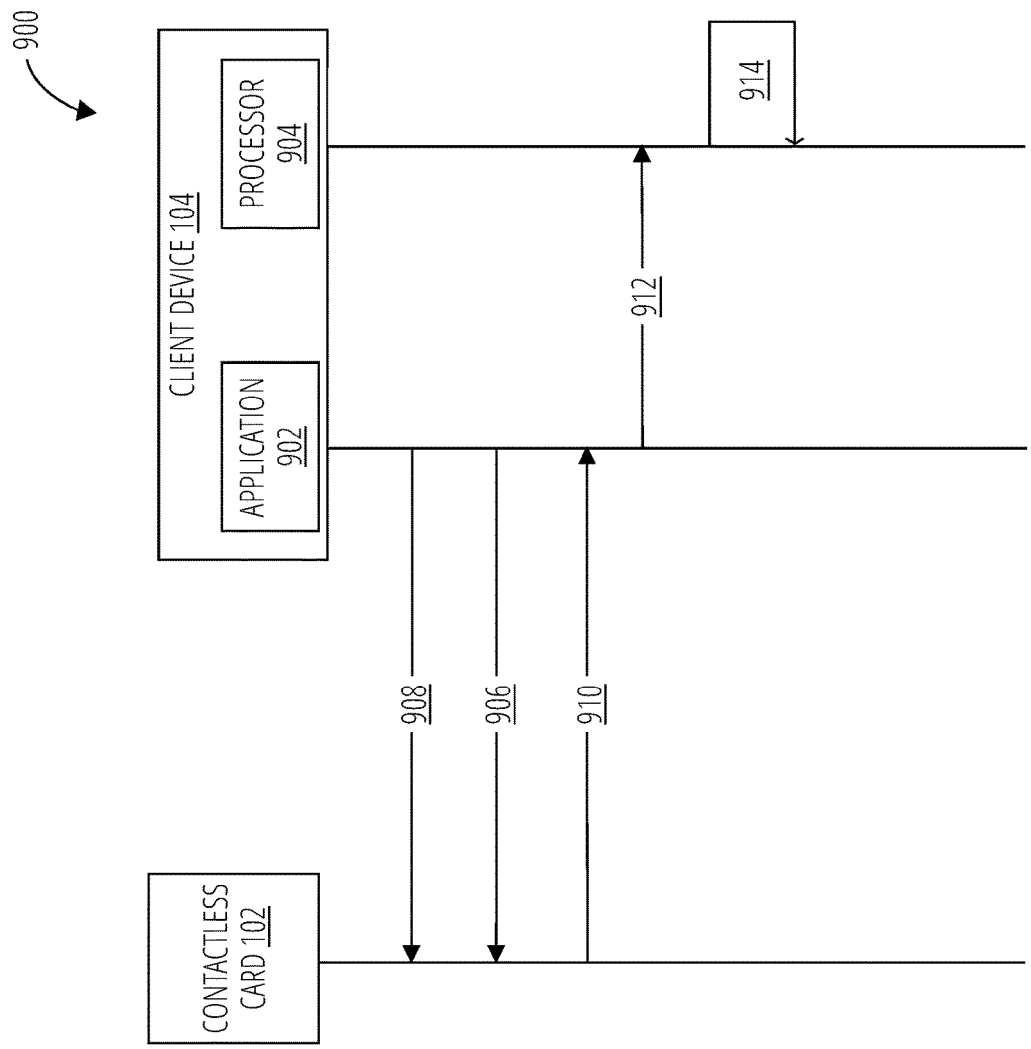
FIG. 9 illustrates a sequence flow 900 in accordance with one embodiment.

FIG. 9 is a timing diagram illustrating an example sequence for providing authenticated access according to one or more embodiments of the present disclosure. Sequence flow 900 may include contactless card 102 and client device 104, which may include an application 902 and processor 904. The application 902 can be any of the applications App 204*a*, 204*b*, App 204*c*, or any other application that executes on the client device 104.

At line 908, the application 902 communicates with the contactless card 102 (e.g., after being brought near the contactless card 102). Communication between the application 902 and the contactless card 102 may involve the contactless card 102 being sufficiently close to a card reader (not shown) of the client device 104 to enable NFC data transfer between the application 902 and the contactless card 102.

At line 906, after communication has been established between client device 104 and contactless card 102, contactless card 102 generates a message authentication code (MAC) cryptogram. In some examples, this may occur when the contactless card 102 is read by the application 902. In particular, this may occur upon a read, such as an NFC read, of a near field data exchange (NDEF) tag, which may be created in accordance with the NFC Data Exchange Format. For example, a reader application, such as application 902, may transmit a message, such as an applet select message, with the applet ID of an NDEF producing applet. Upon confirmation of the selection, a sequence of select file messages followed by read file messages may be transmitted. For example, the sequence may include "Select Capabilities file", "Read Capabilities file", and "Select NDEF file". At this point, a counter value maintained by the contactless card 102 may be updated or incremented, which may be followed by "Read NDEF file." At this point, the message may be generated which may include a header and a shared secret. Session keys may then be generated. The MAC cryptogram may be created from the message, which may include the header and the shared secret. The MAC cryptogram may then be concatenated with one or more blocks of random data, and the MAC cryptogram and a random number (RND) may be encrypted with the session key. Thereafter, the cryptogram and the header may be concatenated, and encoded as ASCII hex and returned in NDEF message format (responsive to the "Read NDEF file" message).

In some examples, the MAC cryptogram may be transmitted as an NDEF tag, and in other examples the MAC cryptogram may be included with a uniform resource indicator (e.g., as a formatted string). In some examples, application 902 may be configured to transmit a request to contactless card 102, the request comprising an instruction to generate a MAC cryptogram.

At line 910, the contactless card 102 sends the MAC cryptogram to the application 902. In some examples, the transmission of the MAC cryptogram occurs via NFC, however, the present disclosure is not limited thereto. In other examples, this communication may occur via Bluetooth, Wi-Fi, or other means of wireless data communication. At line 912, the application 902 communicates the MAC cryptogram to the processor 904.

At line 914, the processor 904 verifies the MAC cryptogram pursuant to an instruction from the application 122. For example, the MAC cryptogram may be verified, as explained below. In some examples, verifying the MAC cryptogram may be performed by a device other than client device 104, such as a server of a banking system in data communication with the client device 104. For example, processor 904 may output the MAC cryptogram for transmission to the server of the banking system, which may verify the MAC cryptogram. In some examples, the MAC cryptogram may function as a digital signature for purposes of verification. Other digital signature algorithms, such as public key asymmetric algorithms, e.g., the Digital Signature Algorithm and the RSA algorithm, or zero knowledge protocols, may be used to perform this verification.

Figure 10:
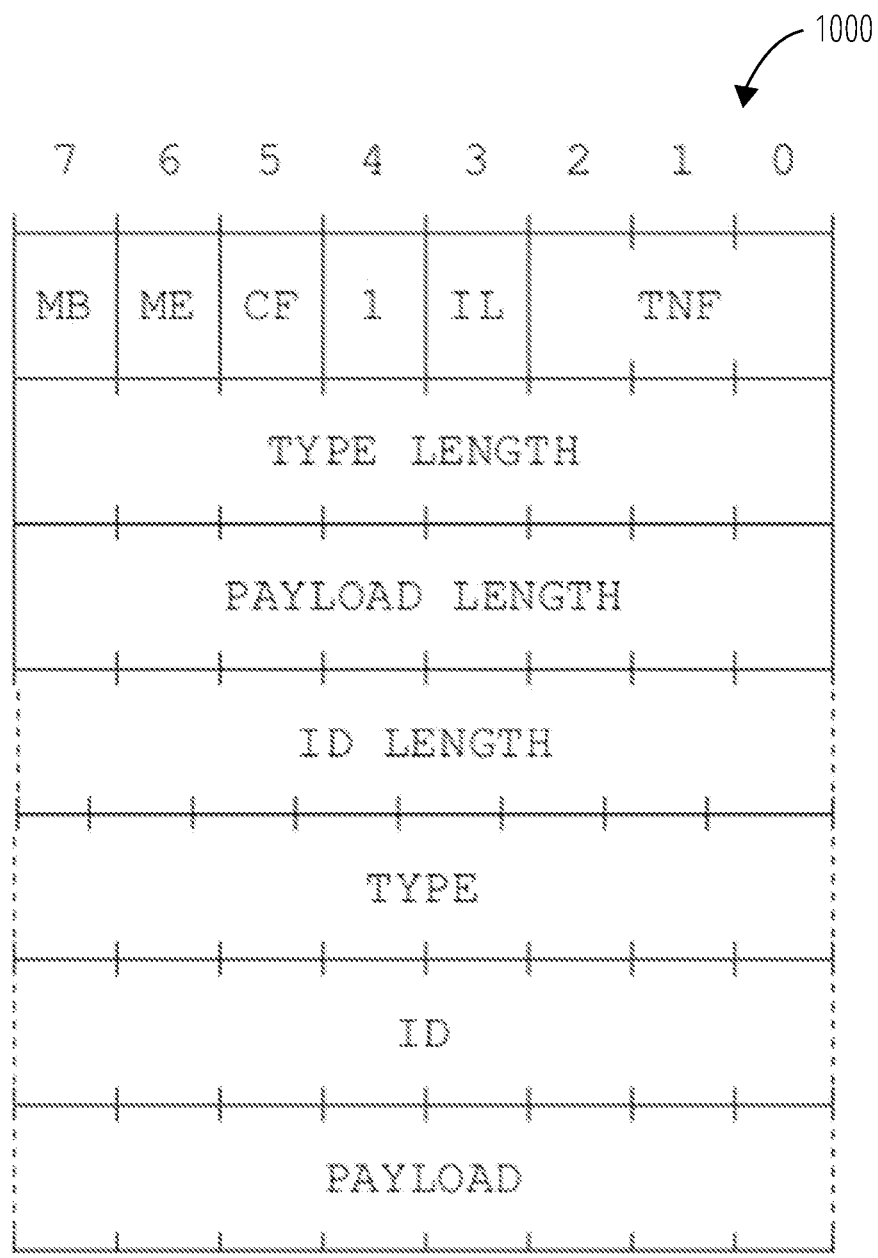
FIG. 10 illustrates a data structure 1000 in accordance with one embodiment.

FIG. 10 illustrates an NDEF short-record layout (SR=1) data structure 1000 according to an example embodiment. One or more applets may be configured to encode the OTP as an NDEF type 4 well known type text tag. In some examples, NDEF messages may comprise one or more records. The applets may be configured to add one or more static tag records in addition to the OTP record. Exemplary tags include, without limitation, Tag type: well known type, text, encoding English (en); Applet ID: D2760000850101; Capabilities: read-only access; Encoding: the authentication message may be encoded as ASCII hex; type-length-value (TLV) data may be provided as a personalization parameter that may be used to generate the NDEF message. In an embodiment, the authentication template may comprise the first record, with a well-known index for providing the actual dynamic authentication data.

Figure 11:
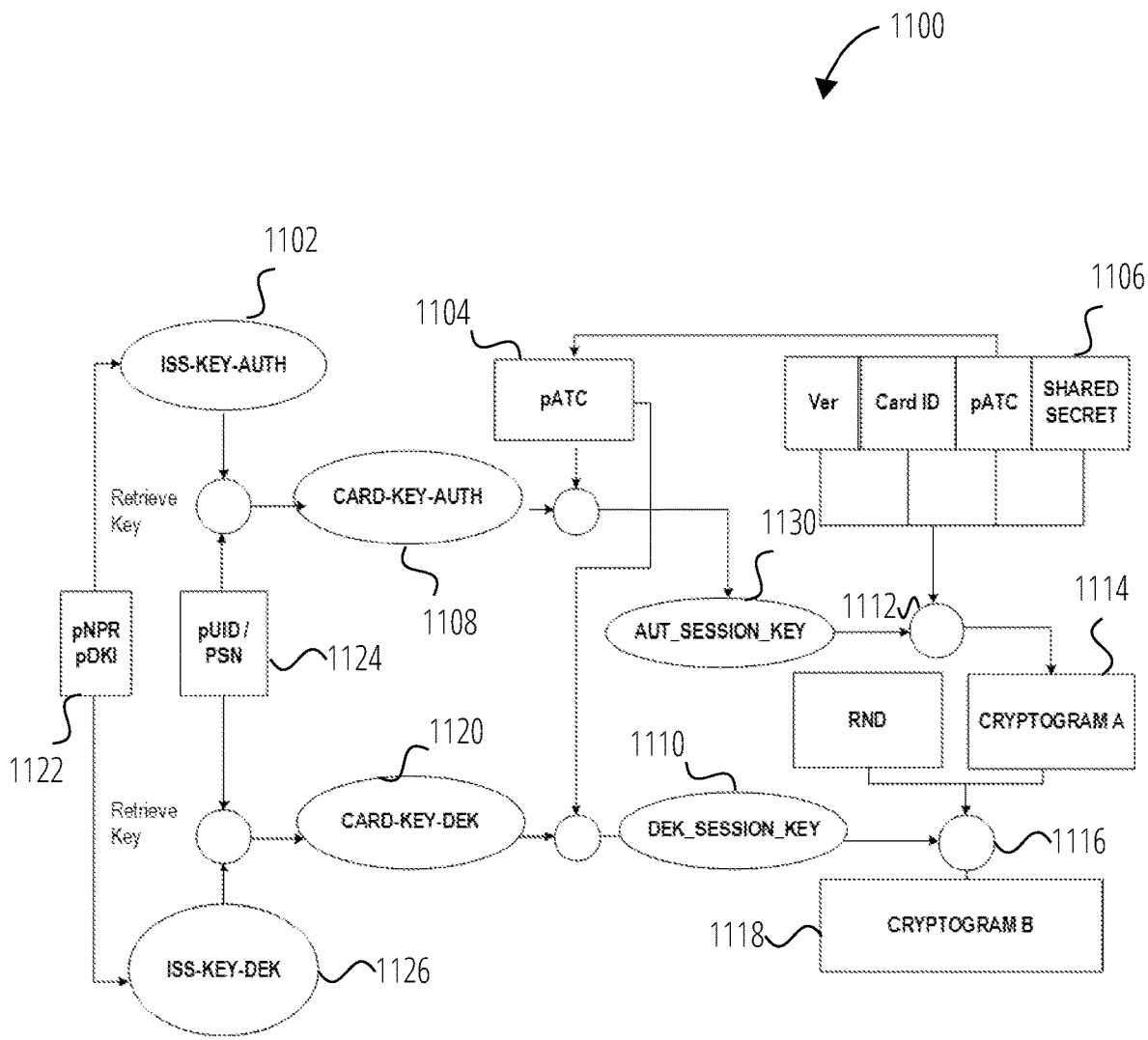
FIG. 11 is a diagram of a key system according to an example embodiment.

FIG. 11 illustrates a diagram of a system 1100 configured to implement one or more embodiments of the present disclosure. As explained below, during the contactless card creation process, two cryptographic keys may be assigned uniquely for each card. The cryptographic keys may comprise symmetric keys which may be used in both encryption and decryption of data. Triple DES (3DES) algorithm may be used by EMV and it is implemented by hardware in the contactless card. By using a key diversification process, one or more keys may be derived from a master key based upon uniquely identifiable information for each entity that requires a key.

Regarding master key management, two issuer master keys 1102, 1126 may be required for each part of the portfolio on which the one or more applets is issued. For example, the first master key 1102 may comprise an Issuer Cryptogram Generation/Authentication Key (Iss-Key-Auth) and the second master key 1126 may comprise an Issuer Data Encryption Key (Iss-Key-DEK). As further explained herein, two issuer master keys 1102, 1126 are diversified into card master keys 1108, 1120, which are unique for each card. In some examples, a network profile record ID (pNPR) 522 and derivation key index (pDKI) 1124, as back office data, may be used to identify which Issuer Master Keys 1102, 1126 to use in the cryptographic processes for authentication. The system performing the authentication may be configured to retrieve values of pNPR 1122 and pDKI 1124 for a contactless card at the time of authentication.

In some examples, to increase the security of the solution, a session key may be derived (such as a unique key per session) but rather than using the master key, the unique card-derived keys and the counter may be used as diversification data, as explained above. For example, each time the card is used in operation, a different key may be used for creating the message authentication code (MAC) and for performing the encryption. Regarding session key generation, the keys used to generate the cryptogram and encipher the data in the one or more applets may comprise session keys based on the card unique keys (Card-Key-Auth 1108 and Card-Key-Dek 1120). The session keys (Aut-Session-Key 1130 and DEK-Session-Key 1110) may be generated by the one or more applets and derived by using the application transaction counter (pATC) 1104 with one or more algorithms. To fit data into the one or more algorithms, only the 2 low order bytes of the 4-byte pATC 1104 is used. In some examples, the four byte session key derivation method may comprise: F1: =PATC (lower 2 bytes)||'F0'||'00'||PATC (four bytes) F1: =PATC (lower 2 bytes)||'0F'||'00'||PATC (four bytes) SK: ={(ALG (MK) [F1])||ALG (MK) [F2]}, where ALG may include 3DES ECB and MK may include the card unique derived master key.

As described herein, one or more MAC session keys may be derived using the lower two bytes of pATC 1104 counter. At each tap of the contactless card, pATC 1104 is configured to be updated, and the card master keys Card-Key-AUTH 508 and Card-Key-DEK 1120 are further diversified into the session keys Aut-Session-Key 1130 and DEK-Session-KEY 1110. pATC 1104 may be initialized to zero at personalization or applet initialization time. In some examples, the pATC counter 1104 may be initialized at or before personalization, and may be configured to increment by one at each NDEF read.

Further, the update for each card may be unique, and assigned either by personalization, or algorithmically assigned by pUID or other identifying information. For example, odd numbered cards may increment or decrement by 2 and even numbered cards may increment or decrement by 5. In some examples, the update may also vary in sequential reads, such that one card may increment in sequence by 1, 3, 5, 2, 2, . . . repeating. The specific sequence or algorithmic sequence may be defined at personalization time, or from one or more processes derived from unique identifiers. This can make it harder for a replay attacker to generalize from a small number of card instances.

The authentication message may be delivered as the content of a text NDEF record in hexadecimal ASCII format. In some examples, only the authentication data and an 8-byte random number followed by MAC of the authentication data may be included. In some examples, the random number may precede cryptogram A and may be one block long. In other examples, there may be no restriction on the length of the random number. In further examples, the total data (i.e., the random number plus the cryptogram) may be a multiple of the block size. In these examples, an additional 8-byte block may be added to match the block produced by the MAC algorithm. As another example, if the algorithms employed used 16-byte blocks, even multiples of that block size may be used, or the output may be automatically, or manually, padded to a multiple of that block size.

The MAC may be performed by a function key (AUT-Session-Key) 1130. The data specified in cryptogram may be processed with javacard.signature method: ALG_DES_MAC8_ISO9797_1_M2_ALG3 to correlate to EMV ARQC verification methods. The key used for this computation may comprise a session key AUT-Session-Key 1130, as explained above. As explained above, the low order two bytes of the counter may be used to diversify for the one or more MAC session keys. As explained below, AUT-Session-Key 1130 may be used to MAC data 1106, and the resulting data or cryptogram An 1114 and random number RND may be encrypted using DEK-Session-Key 1110 to create cryptogram B or output 1118 sent in the message.

In some examples, one or more HSM commands may be processed for decrypting such that the final 16 (binary, 32 hex) bytes may comprise a 3DES symmetric encrypting using CBC mode with a zero IV of the random number followed by MAC authentication data. The key used for this encryption may comprise a session key DEK-Session-Key 1110 derived from the Card-Key-DEK 1120. In this case, the ATC value for the session key derivation is the least significant byte of the counter pATC 1104.

The format below represents a binary version example embodiment. Further, in some examples, the first byte may be set to ASCII 'A'.

| Message Format 1 | 2 | 4 | 8 | 8 |
|---|---|---|---|---|
| 0x43 (Message Type 'A') | Version | pATC | RND | Cryptogram A (MAC) |
| Cryptogram A (MAC) | 8 bytes | | | |
| MAC of 2 Version Message Format 1 | 8 pUID | 4 pATC | 4 Shared Secret | 18 bytes input data |
| 2 | | 4 | | 16 |
| 0x43 (Message Type 'A') | Version | | pATC | Cryptogram B |
| Cryptogram A (MAC) | 8 bytes | | | |
| MAC of 2 Version | 8 pUID | 4 pATC | 4 Shared Secret | 18 bytes input data |
| Cryptogram B Sym Encryption of 8 RND | | | | 16 8 Cryptogram A |

Another exemplary format is shown below. In this example, the tag may be encoded in hexadecimal format.

| Message Format 2 | 8 | 4 | 8 | 8 |
|---|---|---|---|---|
| Version | pUID | pATC | RND | Cryptogram A (MAC) |
| 8 bytes | | | | |
| 8 pUID | 8 pUID | 4 pATC | 4 Shared Secret | 18 bytes input data |
| Message Format 2 | 8 | | 4 | 16 |
| Version | pUID | | pATC | Cryptogram B |
| 8 bytes 8 | | 4 | 4 | 18 bytes |
| pUID | pUID | pATC Shared | Secret | |
| Cryptogram B | | | | 16 |
| Sym Encryption of 8 RND | | | | 8 Cryptogram A |

The UID field of the received message may be extracted to derive, from master keys Iss-Key-AUTH 905 and Iss-Key-DEK 910, the card master keys (Card-Key-Auth 925 and Card-Key-DEK 930) for that particular card. Using the card master keys (Card-Key-Auth 508 and Card-Key-DEK 1120), the counter (pATC) field of the received message may be used to derive the session keys (Aut-Session-Key 1130 and DEK-Session-Key 1110) for that particular card. Cryptogram B 1118 may be decrypted using the DEK-Session-KEY, which yields cryptogram An 1114 and RND, and RND may be discarded. The UID field may be used to look up the shared secret of the contactless card which, along with the Ver, UID, and pATC fields of the message, may be processed through the cryptographic MAC using the re-created Aut-Session-Key to create a MAC output, such as MAC'. If MAC' is the same as cryptogram An 1114, then this indicates that the message decryption and MAC checking have all passed. Then the pATC may be read to determine if it is valid.

During an authentication session, one or more cryptograms may be generated by the one or more applications. For example, the one or more cryptograms may be generated as a 3DES MAC using ISO 9797-1 Algorithm 3 with Method 2 padding via one or more session keys, such as Aut-Session-Key 1130. The input data 1106 may take the following form: Version (2), pUID (8), pATC (4), Shared Secret (4). In some examples, the numbers in the brackets may comprise length in bytes. In some examples, the shared secret may be generated by one or more random number generators which may be configured to ensure, through one or more secure processes, that the random number is unpredictable. In some examples, the shared secret may comprise a random 4-byte binary number injected into the card at personalization time that is known by the authentication service. During an authentication session, the shared secret may not be provided from the one or more applets to the mobile application. Method 2 padding may include adding a mandatory 0x'80' byte to the end of input data and 0x'00' bytes that may be added to the end of the resulting data up to the 8-byte boundary. The resulting cryptogram may comprise 8 bytes in length.

In some examples, one benefit of encrypting an unshared random number as the first block with the MAC cryptogram, is that it acts as an initialization vector while using CBC (Block chaining) mode of the symmetric encryption algorithm. This allows the "scrambling" from block to block without having to pre-establish either a fixed or dynamic IV.

By including the application transaction counter (pATC) as part of the data included in the MAC cryptogram, the authentication service may be configured to determine if the value conveyed in the clear data has been tampered with. Moreover, by including the version in the one or more cryptograms, it is difficult for an attacker to purposefully misrepresent the application version in an attempt to downgrade the strength of the cryptographic solution. In some examples, the pATC may start at zero and be updated by 1 each time the one or more applications generates authentication data. The authentication service may be configured to track the pATCs used during authentication sessions. In some examples, when the authentication data uses a pATC equal to or lower than the previous value received by the authentication service, this may be interpreted as an attempt to replay an old message, and the authenticated may be rejected. In some examples, where the pATC is greater than the previous value received, this may be evaluated to determine if it is within an acceptable range or threshold, and if it exceeds or is outside the range or threshold, verification may be deemed to have failed or be unreliable. In the MAC operation 1112, data 1106 is processed through the MAC using Aut-Session-Key 1130 to produce MAC output (cryptogram A) 1114, which is encrypted.

In order to provide additional protection against brute force attacks exposing the keys on the card, it is desirable that the MAC cryptogram 1114 be enciphered. In some examples, data or cryptogram An 1114 to be included in the ciphertext may comprise: Random number (8), cryptogram (8). In some examples, the numbers in the brackets may comprise length in bytes. In some examples, the random number may be generated by one or more random number generators which may be configured to ensure, through one or more secure processes, that the random number is unpredictable. The key used to encipher this data may comprise a session key. For example, the session key may comprise DEK-Session-Key 1110. In the encryption operation 1116, data or cryptogram An 1114 and RND are processed using DEK-Session-Key 510 to produce encrypted data, cryptogram B 1118. The data 1114 may be enciphered using 3DES in cipher block chaining mode to ensure that an attacker must run any attacks over all of the ciphertext. As a non-limiting example, other algorithms, such as Advanced Encryption Standard (AES), may be used. In some examples, an initialization vector of 0x'0000000000000000' may be used. Any attacker seeking to brute force the key used for enciphering this data will be unable to determine when the correct key has been used, as correctly decrypted data will be indistinguishable from incorrectly decrypted data due to its random appearance.

In order for the authentication service to validate the one or more cryptograms provided by the one or more applets, the following data must be conveyed from the one or more applets to the mobile device in the clear during an authentication session: version number to determine the cryptographic approach used and message format for validation of the cryptogram, which enables the approach to change in the future; pUID to retrieve cryptographic assets, and derive the card keys; and pATC to derive the session key used for the cryptogram.

Figure 12:
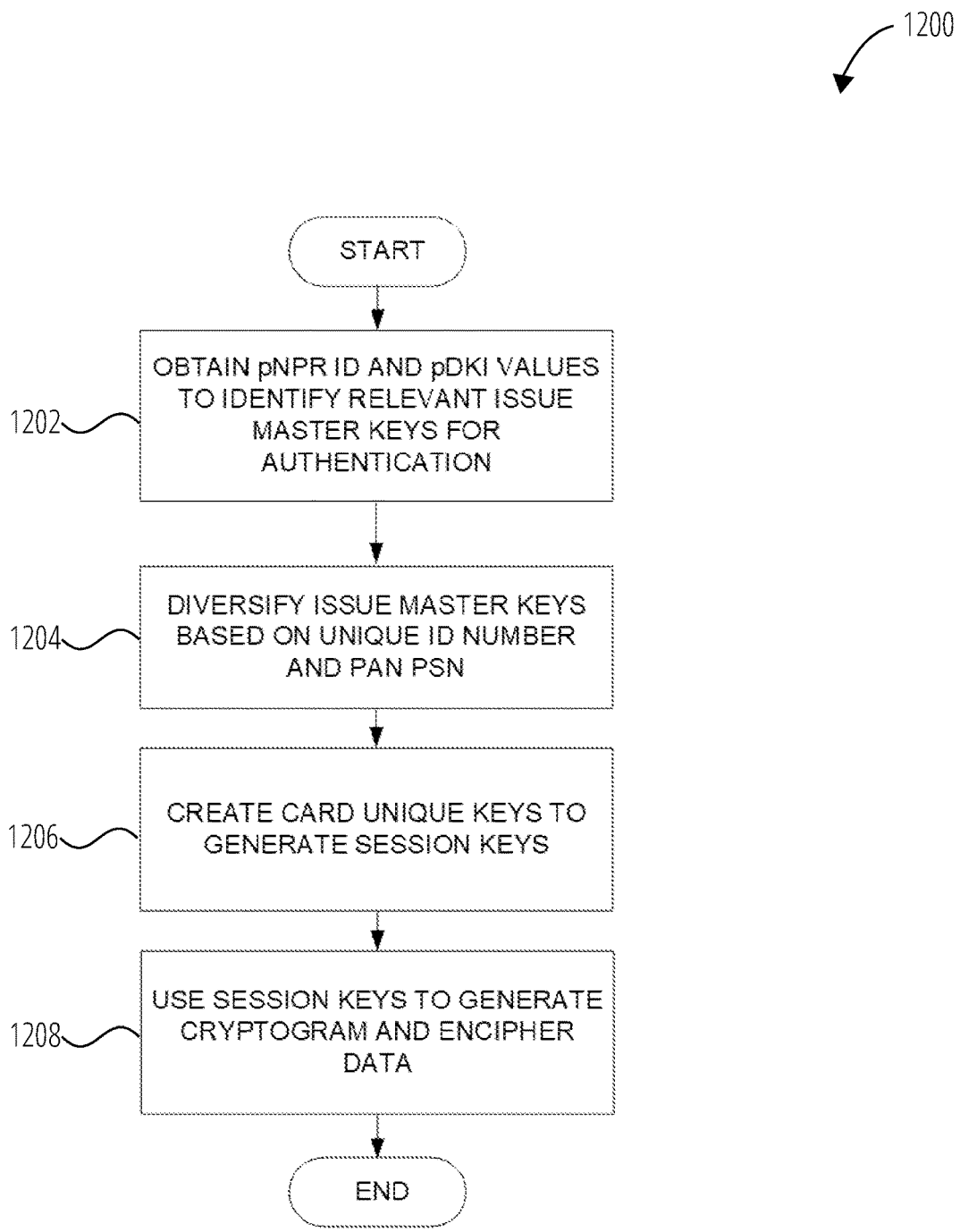
FIG. 12 is a flowchart of a method of generating a cryptogram according to an example embodiment.

FIG. 12 illustrates a method 1200 for generating a cryptogram. For example, at block 1202, a network profile record ID (pNPR) and derivation key index (pDKI) may be used to identify which Issuer Master Keys to use in the cryptographic processes for authentication. In some examples, the method may include performing the authentication to retrieve values of pNPR and pDKI for a contactless card at the time of authentication.

At block 1204, Issuer Master Keys may be diversified by combining them with the card's unique ID number (pUID) and the PAN sequence number (PSN) of one or more applets, for example, a payment applet.

At block 1206, Card-Key-Auth and Card-Key-DEK (unique card keys) may be created by diversifying the Issuer Master Keys to generate session keys which may be used to generate a MAC cryptogram.

At block 1208, the keys used to generate the cryptogram and encipher the data in the one or more applets may comprise the session keys of block 1030 based on the card unique keys (Card-Key-Auth and Card-Key-DEK). In some examples, these session keys may be generated by the one or more applets and derived by using pATC, resulting in session keys Aut-Session-Key and DEK-Session-Key.

Figure 13:
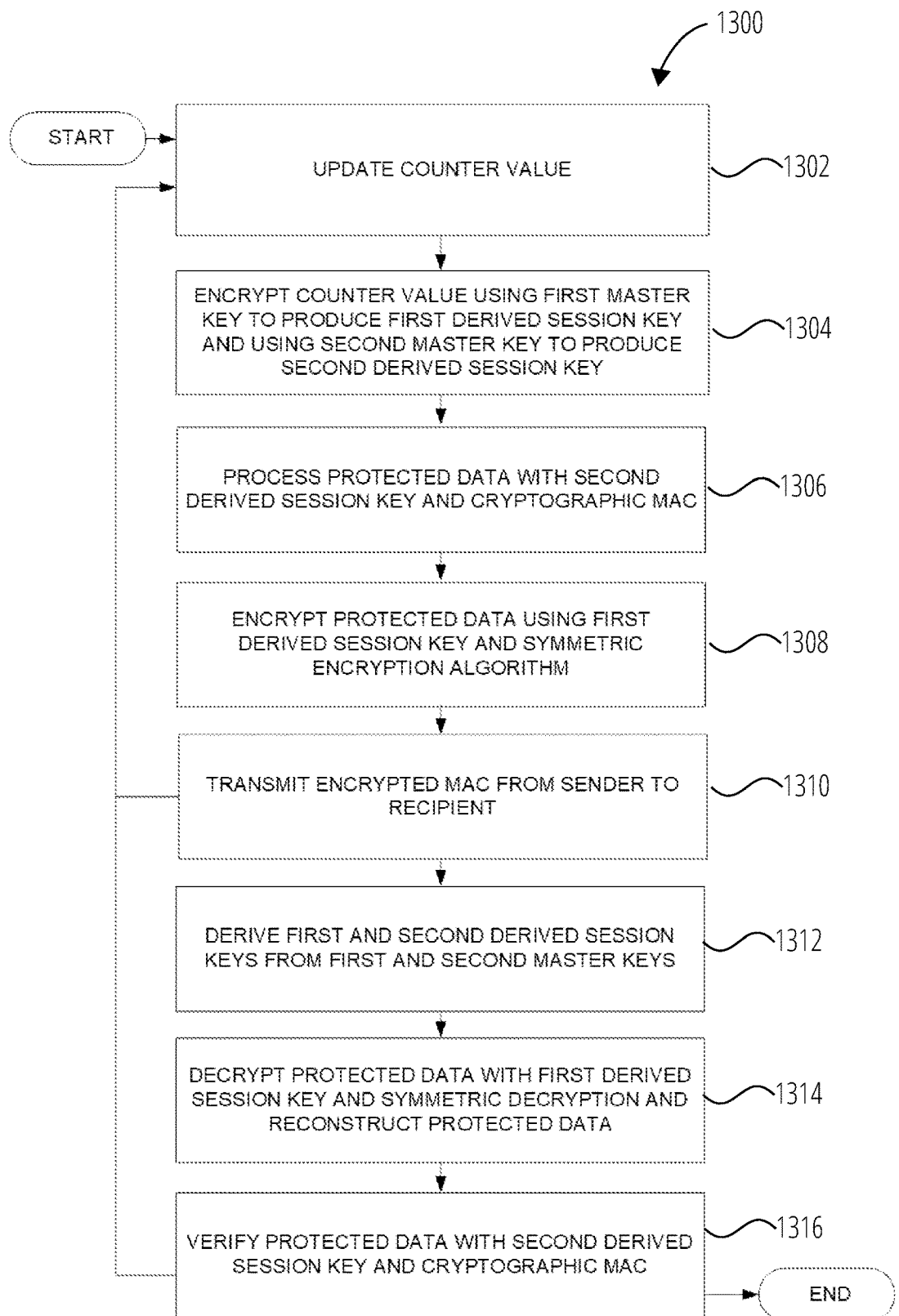
FIG. 13 illustrates an aspect of the subject matter in accordance with one embodiment.

FIG. 13 depicts an exemplary process 1300 illustrating key diversification according to one example. Initially, a sender and the recipient may be provisioned with two different master keys. For example, a first master key may comprise the data encryption master key, and a second master key may comprise the data integrity master key. The sender has a counter value, which may be updated at block 1302, and other data, such as data to be protected, which it may secure share with the recipient.

At block 1304, the counter value may be encrypted by the sender using the data encryption master key to produce the data encryption derived session key, and the counter value may also be encrypted by the sender using the data integrity master key to produce the data integrity derived session key. In some examples, a whole counter value or a portion of the counter value may be used during both encryptions.

In some examples, the counter value may not be encrypted. In these examples, the counter may be transmitted between the sender and the recipient in the clear, i.e., without encryption.

At block 1306, the data to be protected is processed with a cryptographic MAC operation by the sender using the data integrity session key and a cryptographic MAC algorithm. The protected data, including plaintext and shared secret, may be used to produce a MAC using one of the session keys (AUT-Session-Key).

At block 1308, the data to be protected may be encrypted by the sender using the data encryption derived session key in conjunction with a symmetric encryption algorithm. In some examples, the MAC is combined with an equal amount of random data, for example each 8 bytes long, and then encrypted using the second session key (DEK-Session-Key).

At block 1310, the encrypted MAC is transmitted, from the sender to the recipient, with sufficient information to identify additional secret information (such as shared secret, master keys, etc.), for verification of the cryptogram.

At block 1312, the recipient uses the received counter value to independently derive the two derived session keys from the two master keys as explained above.

At block 1314, the data encryption derived session key is used in conjunction with the symmetric decryption operation to decrypt the protected data. Additional processing on the exchanged data will then occur. In some examples, after the MAC is extracted, it is desirable to reproduce and match the MAC. For example, when verifying the cryptogram, it may be decrypted using appropriately generated session keys. The protected data may be reconstructed for verification. A MAC operation may be performed using an appropriately generated session key to determine if it matches the decrypted MAC. As the MAC operation is an irreversible process, the only way to verify is to attempt to recreate it from source data.

At block 1316, the data integrity derived session key is used in conjunction with the cryptographic MAC operation to verify that the protected data has not been modified.

Some examples of the methods described herein may advantageously confirm when a successful authentication is determined when the following conditions are met. First, the ability to verify the MAC shows that the derived session key was proper. The MAC may only be correct if the decryption was successful and yielded the proper MAC value. The successful decryption may show that the correctly derived encryption key was used to decrypt the encrypted MAC. Since the derived session keys are created using the master keys known only to the sender (e.g., the transmitting device) and recipient (e.g., the receiving device), it may be trusted that the contactless card which originally created the MAC and encrypted the MAC is indeed authentic. Moreover, the counter value used to derive the first and second session keys may be shown to be valid and may be used to perform authentication operations.

Thereafter, the two derived session keys may be discarded, and the next iteration of data exchange will update the counter value (returning to block 1302) and a new set of session keys may be created (at block 1310). In some examples, the combined random data may be discarded.

Figure 14:
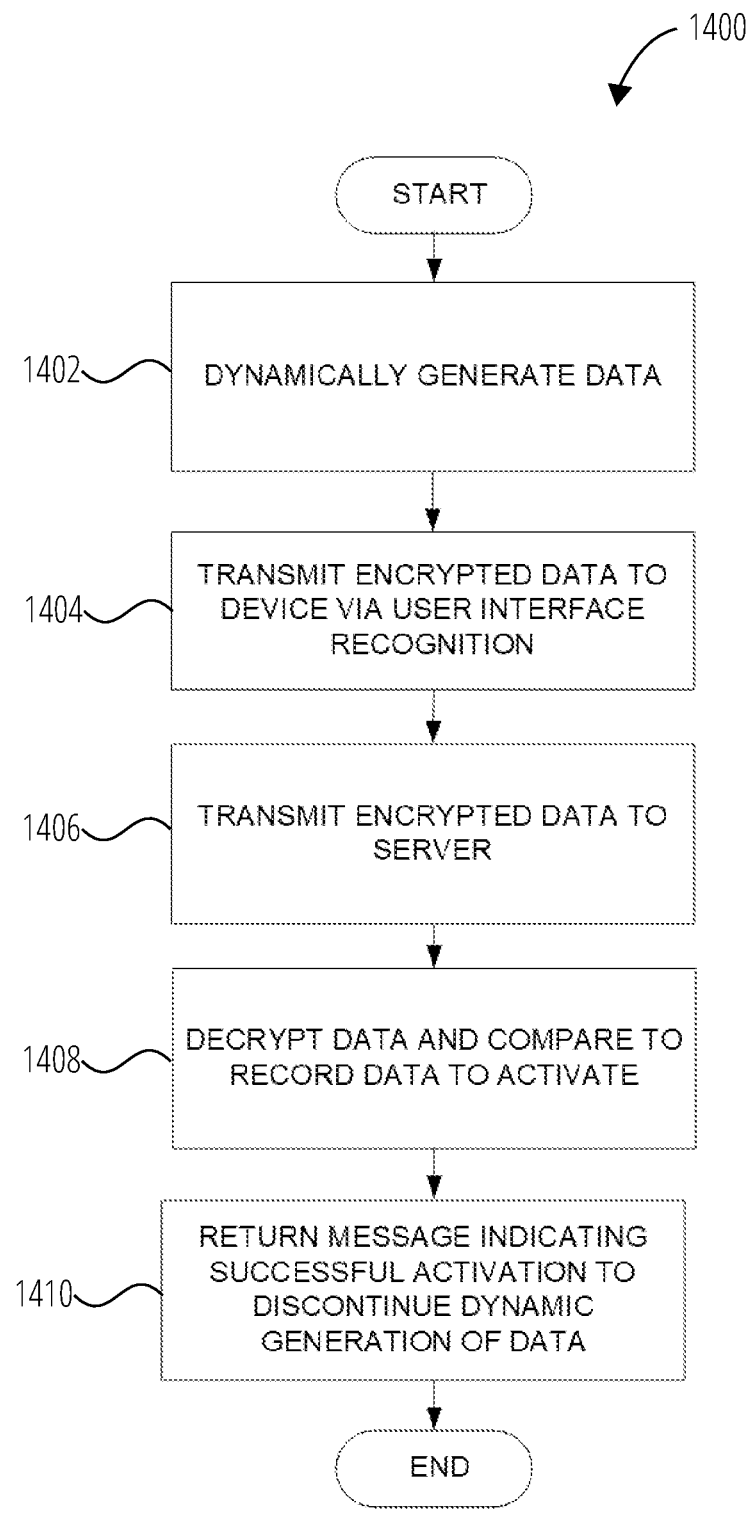
FIG. 14 illustrates an aspect of the subject matter in accordance with one embodiment.

FIG. 14 illustrates a method 1400 for card activation according to an example embodiment. For example, card activation may be completed by a system including a card, a device, and one or more servers. The contactless card, device, and one or more servers may reference same or similar components that were previously explained, such as contactless card 102, client device 104, and server 108.

In block 1402, the card may be configured to dynamically generate data. In some examples, this data may include information such as an account number, card identifier, card verification value, or phone number, which may be transmitted from the card to the device. In some examples, one or more portions of the data may be encrypted via the systems and methods disclosed herein.

In block 1404, one or more portions of the dynamically generated data may be communicated to an application of the device via NFC or other wireless communication. For example, a tap of the card proximate to the device may allow the application of the device to read the one or more portions of the data associated with the contactless card. In some examples, if the device does not comprise an application to assist in activation of the card, the tap of the card may direct the device or prompt the customer to a software application store to download an associated application to activate the card. In some examples, the user may be prompted to sufficiently gesture, place, or orient the card towards a surface of the device, such as either at an angle or flatly placed on, near, or proximate the surface of the device. Responsive to a sufficient gesture, placement and/or orientation of the card, the device may proceed to transmit the one or more encrypted portions of data received from the card to the one or more servers.

In block 1406, the one or more portions of the data may be communicated to one or more servers, such as a card issuer server. For example, one or more encrypted portions of the data may be transmitted from the device to the card issuer server for activation of the card.

In block 1408, the one or more servers may decrypt the one or more encrypted portions of the data via the systems and methods disclosed herein. For example, the one or more servers may receive the encrypted data from the device and may decrypt it in order to compare the received data to record data accessible to the one or more servers. If a resulting comparison of the one or more decrypted portions of the data by the one or more servers yields a successful match, the card may be activated. If the resulting comparison of the one or more decrypted portions of the data by the one or more servers yields an unsuccessful match, one or more processes may take place. For example, responsive to the determination of the unsuccessful match, the user may be prompted to tap, swipe, or wave gesture the card again. In this case, there may be a predetermined threshold comprising a number of attempts that the user is permitted to activate the card. Alternatively, the user may receive a notification, such as a message on his or her device indicative of the unsuccessful attempt of card verification and to call, email or text an associated service for assistance to activate the card, or another notification, such as a phone call on his or her device indicative of the unsuccessful attempt of card verification and to call, email or text an associated service for assistance to activate the card, or another notification, such as an email indicative of the unsuccessful attempt of card verification and to call, email or text an associated service for assistance to activate the card.

In block 1410, the one or more servers may transmit a return message based on the successful activation of the card. For example, the device may be configured to receive output from the one or more servers indicative of a successful activation of the card by the one or more servers. The device may be configured to display a message indicating successful activation of the card. Once the card has been activated, the card may be configured to discontinue dynamically generating data so as to avoid fraudulent use. In this manner, the card may not be activated thereafter, and the one or more servers are notified that the card has already been activated.

The various elements of the devices as previously described with reference to figures herein may include various hardware elements, software elements, or a combination of both. Examples of hardware elements may include devices, logic devices, components, processors, microprocessors, circuits, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores", may be stored on a tangible, machine readable medium and supplied to various customers or manufacturing facilities to load into the fabrication machines that make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writable or rewritable media, digital or analog media, hard disk, floppy disk, Compact Disk Read Only Memory (CD-ROM), Compact Disk Recordable (CD-R), Compact Disk Rewritable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The components and features of the devices described above may be implemented using any combination of discrete circuitry, application specific integrated circuits (ASICs), logic gates and/or single chip architectures. Further, the features of the devices may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It will be appreciated that the exemplary devices shown in the block diagrams described above may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in embodiments.

At least one computer-readable storage medium may include instructions that, when executed, cause a system to perform any of the computer-implemented methods described herein.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Moreover, unless otherwise noted the features described above are recognized to be usable together in any combination. Thus, any features discussed separately may be employed in combination with each other unless it is noted that the features are incompatible with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future filed applications claiming priority to this application may claim the disclosed subject matter in a different manner and may generally include any set of one or more limitations as variously disclosed or otherwise demonstrated herein.

What is claimed is:

1. A computer-implemented method to enable short-range wireless communication via a webpage on a computing device, the computer-implemented method comprising:

receiving, via a web-browser executing on the computing device, from the webpage, a first request to execute a computer-executable instruction, the computer-executable instruction including a request for data from an enterprise server;

receiving, from the enterprise server, a second request to authenticate the first request from the webpage;

triggering, in response to the second request from the enterprise server, the web-browser to execute a predetermined computer program, the predetermined computer program being a browser extension of the web-browser;

scanning, by the predetermined computer program, using a short-range wireless communication module of the computing device, encrypted data from a contactless card;

in response to determining that the first request is authentic based on the encrypted data, transmitting, by the predetermined computer program, a response to the enterprise server causing the enterprise server to send the data; and executing, via the web-browser, the computer-executable instruction from the first request in response to receiving the data sent by the enterprise server.

2. The computer-implemented method of claim 1, wherein scanning the encrypted data from the contactless card includes the browser extension using a native application on the computing device to facilitate scanning of the encrypted data from the contactless card.

3. The computer-implemented method of claim 1, wherein, the predetermined computer program is associated with the enterprise server.

4. The computer-implemented method of claim 1, wherein, to authenticate the first request comprises verification that the first request was initiated by an authorized user.

5. The computer-implemented method of claim 1, wherein, determining that the first request is authentic based on the encrypted data comprises:

validating the encrypted data by the predetermined computer program, and, in response, transmitting, by the predetermined computer program, a response to the enterprise server causing the enterprise server to send the data for the computer-executable instruction.

6. The computer-implemented method of claim 1, wherein determining that the first request is authentic based on the encrypted data comprises:
transmitting the encrypted data by the predetermined computer program, for receipt by the enterprise server, and, in response to validating the encrypted data by the enterprise server, sending, by the enterprise server, the data for the computer-executable instruction.

7. The computer-implemented method of claim 1, wherein, the computer-executable instruction is part of a secure transaction being performed via the web-browser on the webpage.

8. The computer-implemented method of claim 7, wherein, the secure transaction comprises a login transaction, a commercial transaction, or a data transfer transaction.

9. The computer-implemented method of claim 1, wherein, the enterprise server is one of a bank server, an authentication server, an intermediate server, or combination thereof.

10. A computing device comprising:
a processor; and
a memory storing instructions that, when executed by the processor, configure the computing device to:
receive, via a web-browser executing on the computing device, from a webpage, a first request to execute a computer-executable instruction, the computer-executable instruction requests data from an enterprise server;
receive, from the enterprise server, a second request to authenticate the first request from the webpage;
trigger, in response to the second request from the enterprise server, the web-browser to execute a predetermined computer program, the predetermined computer program being a browser extension of the web-browser;
read, by the predetermined computer program, using a short-range wireless communication module of the computing device, encrypted data from a contactless card;
in response to determining that the first request is authentic based on the encrypted data, transmit, by the predetermined computer program, a response to the enterprise server causing the enterprise server to send the data; and
execute, via the web-browser, the computer-executable instruction from the first request in response to receiving the data sent by the enterprise server.

11. The computing device of claim 10, wherein the browser extension facilitates communication between the webpage and a banking application installed on the computing device, the banking application being associated with an issuer of the contactless card; and
wherein the browser extension sends the encrypted data to the baking application to determine that the first request is authentic.

12. The computing device of claim 10, wherein, the predetermined computer program is associated with the enterprise server.

13. The computing device of claim 10, wherein, to authenticate the first request comprises verification that the first request was initiated by an authorized user.

14. The computing device of claim 10, wherein, determining that the first request is authentic based on the encrypted data comprises:

validate the encrypted data by the predetermined computer program, and, in response, transmitting, by the predetermined computer program, a response to the enterprise server causing the enterprise server to send the data for the computer-executable instruction.

15. The computing device of claim 10, wherein determining that the first request is authentic based on the encrypted data comprises:
transmit the encrypted by the predetermined computer program, for receipt by the enterprise server, and, in response to validating the encrypted data by the enterprise server, sending, by the enterprise server, the data for the computer-executable instruction.

16. The computing device of claim 10, wherein, the computer-executable instruction is part of a secure transaction being performed via the web-browser on the webpage.

17. The computing device of claim 16, wherein, the secure transaction comprises a login transaction, a commercial transaction, or a data transfer transaction.

18. The computing device of claim 10, wherein, the enterprise server is at least one of a bank server, an authentication server, an intermediate server, or a combination thereof.

19. A non-transitory computer-readable storage medium, the computer-readable storage medium including instructions that when executed by a computing device, cause the computing device to:
receive, via a web-browser executing on the computing device, from a webpage, a first request to execute a computer-executable instruction, the computer-executable instruction requests data from an enterprise server;
receive, from the enterprise server, a second request to authenticate the first request from the webpage;
trigger, in response to the second request from the enterprise server, the web-browser to execute a predetermined computer program, the predetermined computer program being a browser extension of the web-browser;
receive, by the predetermined computer program, using a short-range wireless communication module of the computing device, encrypted data from a contactless card;
in response to determining that the first request is authentic based on the encrypted data, transmit, by the predetermined computer program, a response to the enterprise server causing the enterprise server to send the data; and
execute, via the web-browser, the computer-executable instruction from the first request in response to receiving the data sent by the enterprise server.

20. The computer-readable storage medium of claim 19, wherein the computing device is further caused to:
receive the browser extension of the web-browser from a server of an issuer of the contactless card; and
install the browser extension on the web-browser.

21. The computer-readable storage medium of claim 19, wherein, determining that the first request is authentic based on the encrypted data comprises:
validate the encrypted data by the predetermined computer program, and, in response, transmitting, by the predetermined computer program, a response to the enterprise server causing the enterprise server to send the data for the computer-executable instruction.

22. The computer-readable storage medium of claim 19, wherein determining that the first request is authentic based on the encrypted data comprises:

transmit the cryptogram by the predetermined computer program, for receipt by the enterprise server, and, in response to validating the cryptogram by the enterprise server, sending, by the enterprise server, the data for the computer-executable instruction.

23. The non-transitory computer-readable storage medium of claim 19, wherein, the computer-executable instruction is part of a secure transaction being performed via the web-browser on the webpage.

24. The non-transitory computer-readable storage medium of claim 23, wherein, the secure transaction comprises a login transaction, a commercial transaction, or a data transfer transaction.

\* \* \* \* \*